US012739829B2

(12) United States Patent
Patchava et al.

(10) Patent No.: US 12,739,829 B2
(45) Date of Patent: Sep. 15, 2026

(54) CONTROL INFORMATION-BASED PACKET STITCHING OF SELF-SCHEDULED UPLINK TRANSMISSIONS

(71) Applicant: QUALCOMM Incorporated, San Diego, CA (US)

(72) Inventors: Raviteja Patchava, San Diego, CA (US); Jing Sun, San Diego, CA (US); Xiaoxia Zhang, San Diego, CA (US); Junyi Li, Greentown, PA (US); Ori Shental, Marlboro, NJ (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 18/794,914

(22) Filed: Aug. 5, 2024

(65) Prior Publication Data

US 2026/0040302 A1 Feb. 5, 2026

(51) Int. Cl.

*H04W 72/1268* (2023.01)
*H04L 1/00* (2006.01)
*H04W 72/0446* (2023.01)
*H04W 72/0453* (2023.01)

(52) U.S. Cl.

CPC ....... *H04W 72/1268* (2013.01); *H04L 1/0009* (2013.01); *H04W 72/0446* (2013.01); *H04W 72/0453* (2013.01)

(58) Field of Classification Search

CPC ....... H04L 1/0009; H04L 1/08; H04L 1/1671; H04L 1/1854; H04L 1/0061; H04L 1/0045; H04L 1/04; H04L 1/1861; H04L 5/0044; H04W 4/40; H04W 72/1268; H04W 72/0446; H04W 72/0453; H04W 72/21; H04W 72/115

See application file for complete search history.

(56) References Cited

U.S. PATENT DOCUMENTS

| | | | | |
|---|---|---|---|---|
| 2020/0228949 | A1* | 7/2020 | Bharadwaj | H04L 5/0044 |
| 2021/0219187 | A1* | 7/2021 | Lee | H04W 4/40 |
| 2024/0348555 | A1* | 10/2024 | Kaplan | H04L 1/08 |

* cited by examiner

*Primary Examiner* — Khoa Huynh

(74) *Attorney, Agent, or Firm* — Holland & Hart LLP

(57) ABSTRACT

Methods, systems, and devices for wireless communication are described. Various aspects relate generally to packet stitching for user equipment (UE) self-scheduled transmissions based on UE-provided control information. Some aspects more specifically relate to a UE transmitting different portions of a coded packet via different time-frequency resources from an uplink resource pool associated with UE self-scheduled transmissions and providing, to a network entity, control information that the network entity may use to stitch the portions of the coded packet together for joint decoding. The UE may transmit each portion of the coded packet, along with accompanying control information, within a respective unit of a set of multiple units. In some examples, to facilitate packet stitching and joint decoding at the network entity, the respective control information within each unit may at least indicate a location of that unit within an ordered sequence of the set of units.

30 Claims, 18 Drawing Sheets

210
Uplink Resource Pool
230-a
225-a
UE 1 (Unit 1)
225-b
235-b
230-b
UE 1 (Unit 2)
225-c
UE 2 (Unit 2)
240-a
f
UE 2 (Unit 1)
230-c
UE 1 (Unit 3)
240-b
235-a
T
205-a
UE 1
115-a
UE 2
115-b
105
205-b
Feedback Message(s)
245
200

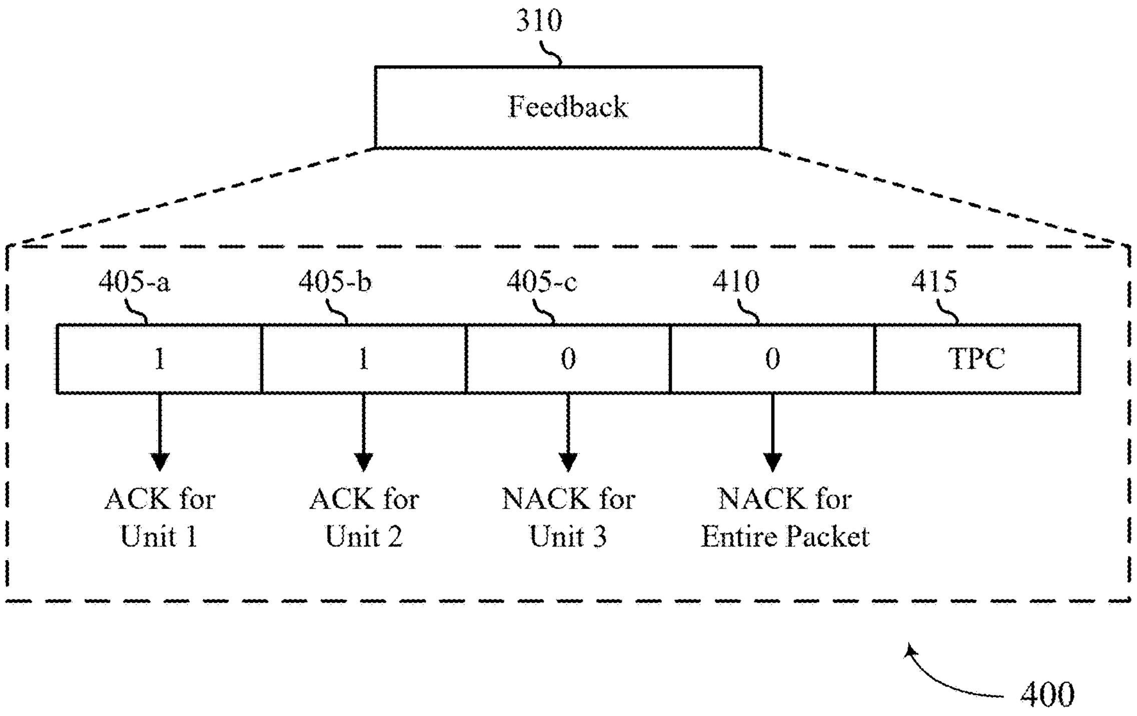
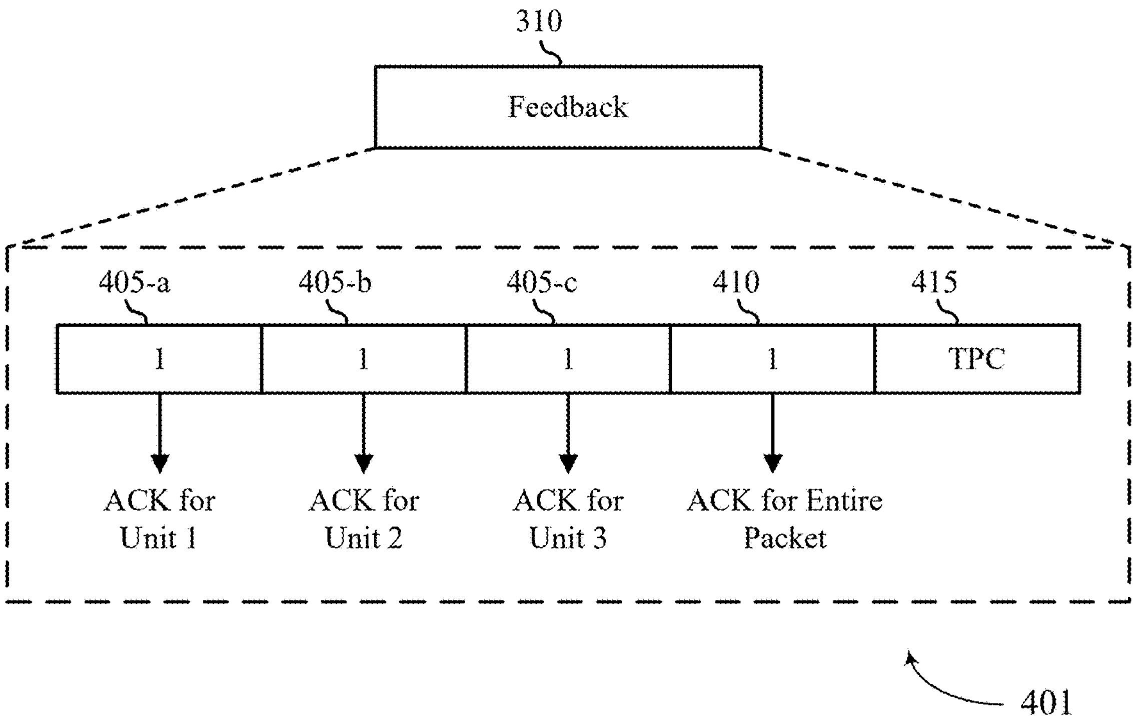
FIG. 4

Transmit control signaling that indicates an uplink resource pool associated with UE self-scheduled transmissions

1705

Receive a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet

1710

Process the set of multiple units in association with attempting to individually decode the respective control information within each unit of the set of multiple units and attempting to jointly decode the set of multiple portions of the coded packet in accordance with the ordered sequence of the set of multiple units

1715

1700

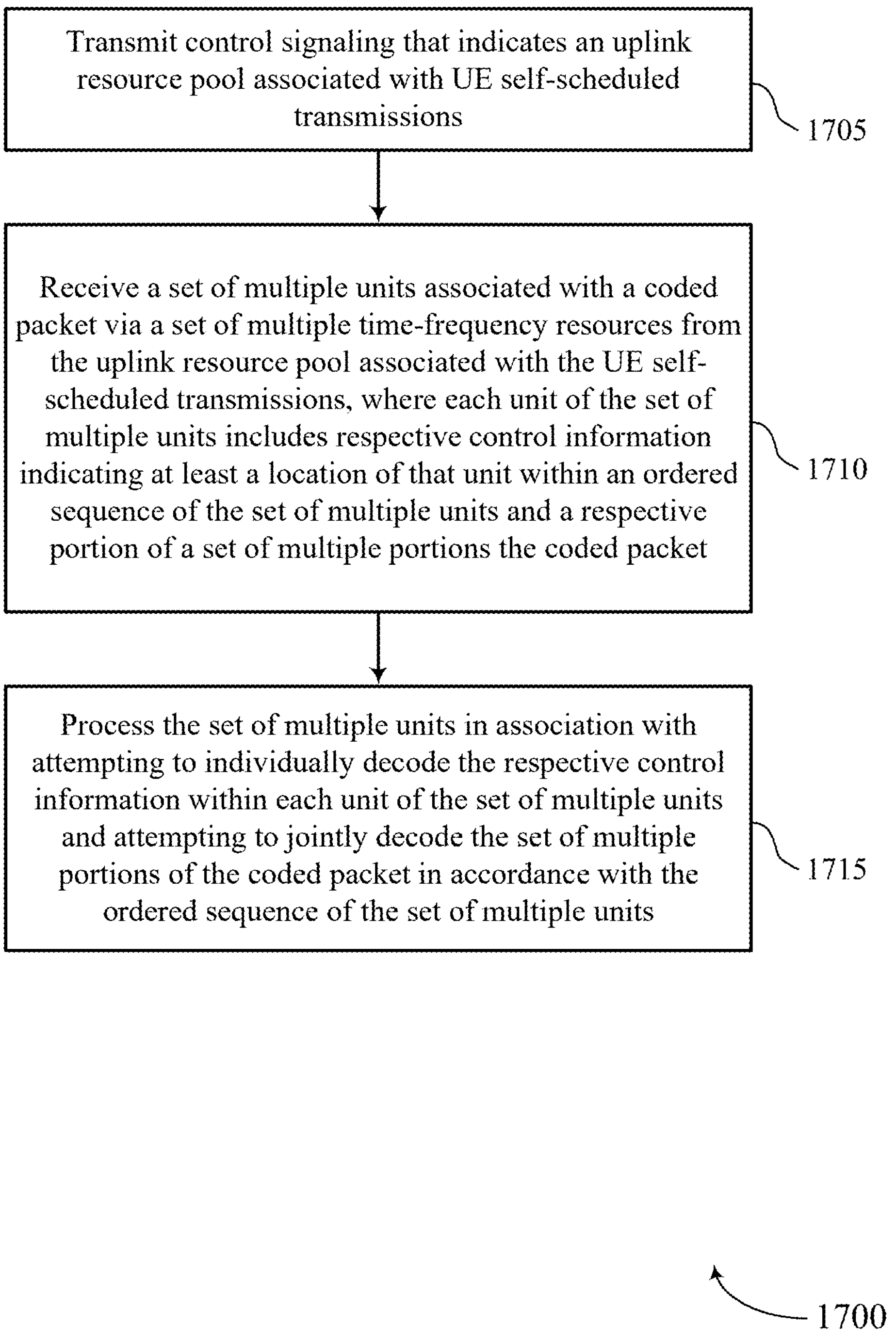

FIG. 17

CONTROL INFORMATION-BASED PACKET STITCHING OF SELF-SCHEDULED UPLINK TRANSMISSIONS

FIELD OF TECHNOLOGY

The following relates to wireless communication, including control information-based packet stitching of self-scheduled uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communication by a user equipment (UE) is described. The method may include receiving control signaling that indicates an uplink resource pool associated with UE self-scheduled transmissions, generating a coded packet based on an uplink data payload, and transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

A UE for wireless communication is described. The UE may include one or more memories storing processor executable code, and one or more processors coupled with the one or more memories. The one or more processors may individually or collectively be operable to execute the code to cause the UE to receive control signaling that indicates an uplink resource pool associated with UE self-scheduled transmissions, generate a coded packet based on an uplink data payload, and transmit a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

Another UE for wireless communication is described. The UE may include means for receiving control signaling that indicates an uplink resource pool associated with UE self-scheduled transmissions, means for generating a coded packet based on an uplink data payload, and means for transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

A non-transitory computer-readable medium storing code for wireless communication is described. The code may include instructions executable by one or more processors to receive control signaling that indicates an uplink resource pool associated with UE self-scheduled transmissions, generate a coded packet based on an uplink data payload, and transmit a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

In some examples of the method, UEs, and non-transitory computer-readable medium described herein, transmitting the set of multiple units associated with the coded packet may include operations, features, means, or instructions for transmitting a first unit associated with the coded packet via a first time-frequency resource of the set of multiple time-frequency resources, where the first unit includes first control information indicating at least a first location of the first unit within the ordered sequence of the set of multiple units and a first portion of the coded packet and transmitting a second unit associated with the coded packet via a second time-frequency resource of the set of multiple time-frequency resources, where the second unit includes second control information indicating at least a second location of the second unit within the ordered sequence of the set of multiple units and a second portion of the coded packet.

In some examples of the method, UEs, and non-transitory computer-readable medium described herein, the respective control information within each unit of the set of multiple units may be associated with an independent cyclic redundancy check (CRC), the respective control information within each unit of the set of multiple units being self-decodable in accordance with being associated with the independent CRC.

In some examples of the method, UEs, and non-transitory computer-readable medium described herein, the respective control information within each unit of the set of multiple units may be associated with an identifier of the UE or indicates a quantity of the set of multiple units associated with the coded packet.

In some examples of the method, UEs, and non-transitory computer-readable medium described herein, the respective control information within each unit of the set of multiple units indicates a size or a modulation and coding scheme (MCS) associated with a time-frequency resource via which that unit of the set of multiple units may be transmitted or indicates one or more time-frequency resources of the set of multiple time-frequency resources via which one or more other units of the set of multiple units may be transmitted.

Some examples of the method, UEs, and non-transitory computer-readable medium described herein may further include operations, features, means, or instructions for receiving feedback corresponding to the set of multiple units associated with the coded packet and selectively retransmitting one or more units of the set of multiple units associated with the coded packet in accordance with the feedback.

A method for wireless communication by a network entity is described. The method may include transmitting control signaling that indicates an uplink resource pool associated with UE self-scheduled transmissions, receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet, and processing the set of multiple units in association with attempting to individually decode the respective control information within each unit of the set of multiple units and attempting to jointly decode the set of multiple portions of the coded packet in accordance with the ordered sequence of the set of multiple units.

A network entity for wireless communication is described. The network entity may include one or more memories storing processor executable code, and one or more processors coupled with the one or more memories. The one or more processors may individually or collectively be operable to execute the code to cause the network entity to transmit control signaling that indicates an uplink resource pool associated with UE self-scheduled transmissions, receive a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet, and process the set of multiple units in association with attempting to (e.g., an attempt to) individually decode the respective control information within each unit of the set of multiple units and attempting to (e.g., an attempt to) jointly decode the set of multiple portions of the coded packet in accordance with the ordered sequence of the set of multiple units.

Another network entity for wireless communication is described. The network entity may include means for transmitting control signaling that indicates an uplink resource pool associated with UE self-scheduled transmissions, means for receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet, and means for processing the set of multiple units in association with attempting to individually decode the respective control information within each unit of the set of multiple units and attempting to jointly decode the set of multiple portions of the coded packet in accordance with the ordered sequence of the set of multiple units.

A non-transitory computer-readable medium storing code for wireless communication is described. The code may include instructions executable by one or more processors to transmit control signaling that indicates an uplink resource pool associated with UE self-scheduled transmissions, receive a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet, and process the set of multiple units in association with attempting to individually decode the respective control information within each unit of the set of multiple units and attempting to jointly decode the set of multiple portions of the coded packet in accordance with the ordered sequence of the set of multiple units.

In some examples of the method, network entities, and non-transitory computer-readable medium described herein, receiving the set of multiple units associated with the coded packet via the set of multiple time-frequency resources may include operations, features, means, or instructions for receiving a first unit associated with the coded packet via a first time-frequency resource of the set of multiple time-frequency resources, where the first unit includes first control information indicating at least a first location of the first unit within the ordered sequence of the set of multiple units and a first portion of the coded packet and receiving a second unit associated with the coded packet via a second time-frequency resource of the set of multiple time-frequency resources, where the second unit includes second control information indicating at least a second location of the second unit within the ordered sequence of the set of multiple units and a second portion of the coded packet.

In some examples of the method, network entities, and non-transitory computer-readable medium described herein, processing the set of multiple units may include operations, features, means, or instructions for attempting to decode the first control information in accordance a first independent CRC associated with the first control information, attempting to decode the second control information in accordance a second independent CRC associated with the second control information, and attempting to decode an ordered combination of the first portion of the coded packet and the second portion of the coded packet in accordance with the first control information and the second control information.

In some examples of the method, network entities, and non-transitory computer-readable medium described herein, the respective control information within each unit of the set of multiple units may be associated with an independent CRC, the respective control information within each unit of the set of multiple units being self-decodable in accordance with being associated with the independent CRC.

In some examples of the method, network entities, and non-transitory computer-readable medium described herein, the respective control information within each unit of the set of multiple units may be associated with an identifier of a UE or indicates a quantity of the set of multiple units associated with the coded packet and processing the set of multiple units may be in accordance with the identifier of the UE or the quantity of the set of multiple units.

In some examples of the method, network entities, and non-transitory computer-readable medium described herein, the respective control information within each unit of the set of multiple units indicates a size or an MCS associated with a time-frequency resource via which that unit of the set of multiple units may be transmitted or indicates one or more time-frequency resources of the set of multiple time-frequency resources via which one or more other units of the set of multiple units may be transmitted.

Some examples of the method, network entities, and non-transitory computer-readable medium described herein may further include operations, features, means, or instructions for transmitting feedback corresponding to the set of multiple units associated with the coded packet and selectively receiving a retransmission of one or more units of the set of multiple units associated with the coded packet in accordance with the feedback.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 4 and 5 show example retransmission commands that support control information-based packet stitching of self-scheduled uplink transmissions in accordance with one or more aspects of the present disclosure.

FIGS. 15-18 show flowcharts illustrating methods that support control information-based packet stitching of self-scheduled uplink transmissions in accordance with one or more aspects of the present disclosure.

DETAILED DESCRIPTION

Figure 1:
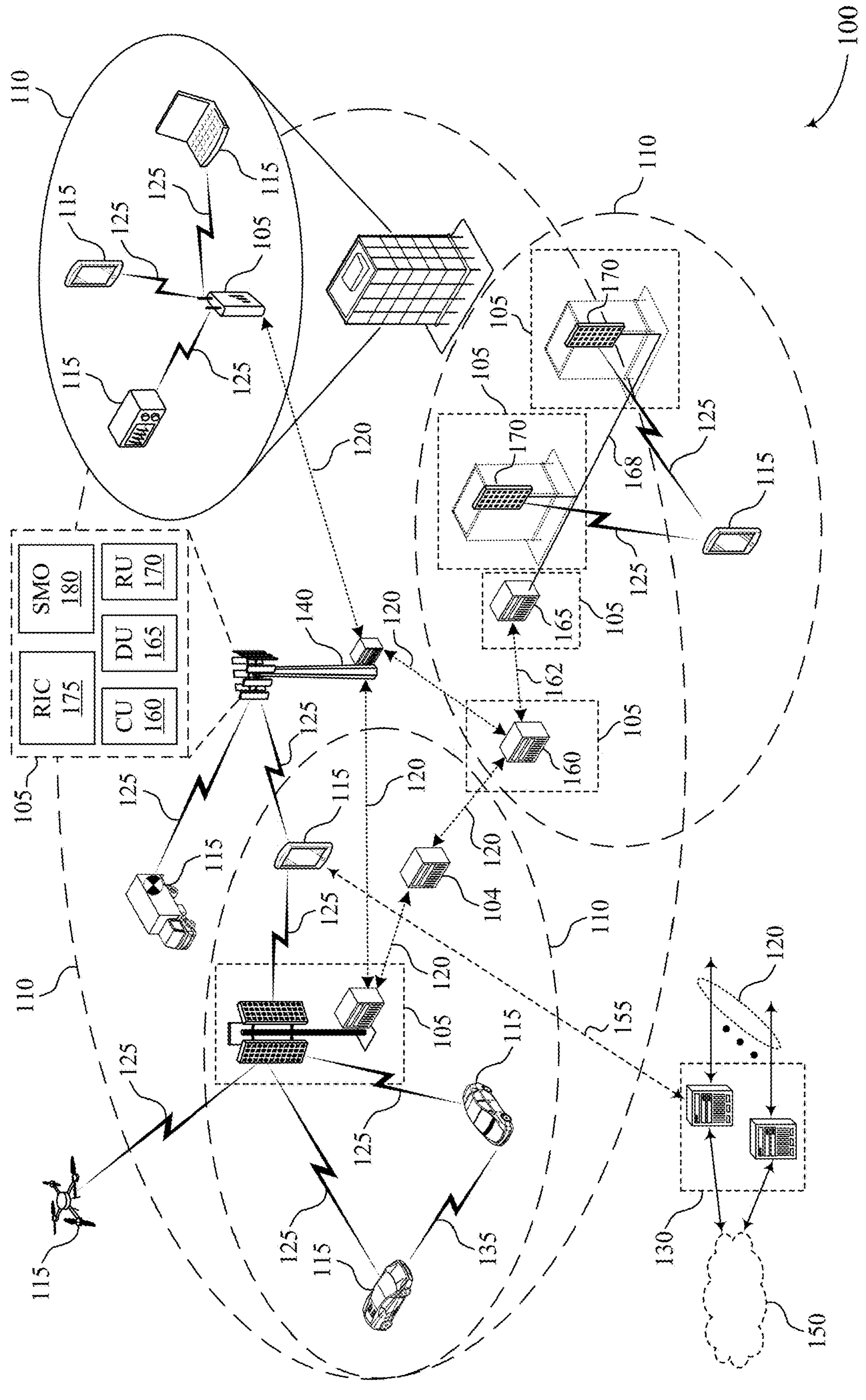
FIG. 1 shows an example wireless communications system that supports control information-based packet stitching of self-scheduled uplink transmissions in accordance with one or more aspects of the present disclosure.

In some wireless communications systems, various wireless communication devices may support self-scheduled uplink transmissions. For example, a user equipment (UE) may perform a self-scheduled uplink transmission to a network entity. A self-scheduled uplink transmission may be an uplink transmission performed in the absence of signaling from a network entity, such as in the absence of downlink control information (DCI) scheduling the uplink transmission. Further, as described herein, a self-scheduled uplink transmission may be equivalently referred to or understood as a UE self-scheduled transmission. In some systems, a network entity may allocate (e.g., configure) an uplink resource pool associated with UE self-scheduled transmissions (such that, for example, resources of the uplink resource pool are exclusively used for UE self-scheduled transmissions). In such systems, a UE may perform a self-scheduled transmission via an uplink resource from the uplink resource pool.

To receive UE self-scheduled transmissions, the network entity may perform blind channel estimation and blind decoding for each resource within the uplink resource pool. Such blind channel estimation and blind decoding for each resource within the uplink resource pool may introduce or cause a relatively high complexity and processing burden at the network entity. UEs may perform self-scheduled uplink transmissions via smaller packets (e.g., via multiple relatively smaller packets, such as sub-packets, instead of one relatively larger packet) to reduce the blind decoding effort at the network entity (as the network entity may perform blind decoding over relatively smaller resources). In some scenarios, however, as a size of packets becomes smaller, system performance may be degraded as compared to when larger packet sizes are used. For example, smaller packets may be associated with less coding gain and less time-frequency diversity as compared to larger packets. Thus, some systems may benefit from additional signaling mechanisms to reduce network side complexity without sacrificing coding gain and time-frequency diversity.

Various aspects relate generally to packet stitching for UE self-scheduled transmissions based on UE-provided control information. Some aspects more specifically relate to a mechanism according to which a UE may transmit different portions of a coded packet via different time-frequency resources from an uplink resource pool associated with UE self-scheduled transmissions and provide, to a network entity, control information that the network entity may use to "stitch" (e.g., combine in order) the portions of the coded packet together for joint decoding. In some examples, the UE may generate a coded packet based on (e.g., in accordance with encoding) an uplink data payload, split the coded packet into multiple portions, and transmit each portion of the coded packet, along with accompanying control information, within a respective unit of a set of multiple units. The UE may transmit each unit via a respective time-frequency resource from the uplink resource pool associated with UE self-scheduled transmissions. In other words, the UE may transmit multiple units associated with the coded packet via multiple time-frequency resources from the uplink resource pool, with each unit including a respective portion of the coded packet and respective control information.

In some examples, to facilitate efficient packet stitching and joint decoding at the network entity, the control information within each unit may include at least an indication of a location of that unit within an ordered sequence of the set of units. For example, a first unit of the set of units may include a first portion of the coded packet and first control information indicating at least a first location of the first unit within the ordered sequence, a second unit of the set of units may include a second portion of the coded packet and second control information indicating at least a second location of the second unit within the ordered sequence, and so on. Additionally, or alternatively, the control information may be associated with a UE identifier (ID) of the UE transmitting the units. In some implementations, the control information may be self-decodable, such as in accordance with an independent cyclic redundancy check (CRC). In such implementations, the network entity may attempt to independently decode the control information within each received unit, combine the portions of the coded packet provided by the received units based on the (successfully decoded) control information, and attempt to jointly decode the combined coded packet portions. The network entity may transmit feedback to the UE associated with the attempted decoding at the network entity, with the feedback including unit level feedback, packet level feedback, redundancy version (RV) information, an uplink grant for a retransmission, or any combination thereof. The UE may selectively retransmit one or more units of the set of units in accordance with the feedback provided by the network entity.

Particular aspects of the subject matter described in this disclosure can be implemented to realize one or more of the following potential advantages. In some examples, by transmitting different portions of a coded packet (of a UE self-scheduled transmission) within different units of a set of units and via different time-frequency resources, with each unit including a respective portion of the coded packet and respective self-decodable control information, the network entity may experience a relatively lower processing burden without sacrificing coding gain and time-frequency diversity. For example, providing self-decodable control information with each portion of the coded packet may reduce a processing burden at the network entity by informing the network entity on how to combine the different portions of the coded packet for joint decoding. Further, distributing the different portions of the coded packet across different time-frequency resources may increase coding gain and time-frequency diversity of packet transmissions, which may increase a likelihood of successful communication between the network entity and the UE.

Additionally, by distributing the different portions of the coded packet across different time-frequency resources, the UE may find relatively more transmission opportunities in accordance with each portion occupying a relatively smaller time-frequency resource as compared to the complete coded packet, which may facilitate lower latency UE self-scheduled transmissions. Moreover, by enabling the network entity to provide unit level feedback, packet level feedback, RV information, an uplink grant for a retransmission, or any combination thereof associated with a UE self-scheduled transmission, the network entity and the UE may implement mechanisms according to which an amount of wireless resources or network congestion is reduced or mitigated while still facilitating successful communication between the network entity and the UE. Such reduced processing burden, greater coding gain and time-frequency diversity, lower latency, and balanced resource utilization with successful communication may additionally facilitate or realize greater system capacity, higher data rates, greater spectral efficiency, and less power/energy costs, among other benefits.

Aspects of the disclosure are initially described in the context of wireless communications systems. Additionally, aspects of the disclosure are further illustrated by and described with reference to a signaling diagram, feedback messages, feedback formats, and a process flow that relate to control information-based packet stitching of self-scheduled uplink transmissions. Aspects of the disclosure are further illustrated by and described with reference to apparatus diagrams, system diagrams, and flowcharts that relate to control information-based packet stitching of self-scheduled uplink transmissions.

FIG. 1 shows an example wireless communications system 100 that supports control information-based packet stitching of self-scheduled uplink transmissions in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home NodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a CRC), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, various wireless communication devices of the wireless communications system 100 may support UE self-scheduled transmissions based on UE-provided control information. For example, a UE 115 may transmit different portions of a coded packet via different time-frequency resources from an uplink resource pool associated with UE self-scheduled transmissions and provide, to a network entity 105, control information that the network entity 105 may use to "stitch" (e.g., combine in order) the portions of the coded packet together for joint decoding. In some examples, the UE 115 may generate a coded packet based on (e.g., in accordance with encoding) an uplink data payload, may split the coded packet into multiple portions, and may transmit each portion of the coded packet, along with accompanying control information, within a respective unit of a set of multiple units. The UE 115 may transmit each unit via a respective time-frequency resource from the uplink resource pool associated with UE self-scheduled transmissions. In other words, the UE 115 may transmit multiple units associated with the coded packet via multiple time-frequency resources from the uplink resource pool, with each unit including a respective portion of the coded packet and respective control information associated with at least that portion of the coded packet.

In some examples, to facilitate efficient packet stitching and joint decoding at the network entity 105, the control information may include at least an indication of a location of that unit within an ordered sequence of the set of units. For example, a first unit of the set of units may include a first portion of the coded packet and first control information indicating at least a first location of the first unit within the ordered sequence, a second unit of the set of units may include a second portion of the coded packet and second control information indicating at least a second location of the second unit within the ordered sequence, and so on. Additionally, or alternatively, the control information may be associated with a UE ID of the UE 115 transmitting the units. Accordingly, the network entity 105 may stich or combine different portions of the coded packet together based on (e.g., using) one or both of indicated locations within an ordered sequence of units or the UE ID. For example, the network entity 105 may combine the first portion received within the first unit and the second portion received within the second unit (in accordance with the indicated order and/or in accordance with the first and second units being transmitted by the same UE 115) and may attempt to jointly decode a combination of the first and second portions.

As described herein, a "unit" may be understood as transmitted information including at least control information and a portion of a coded packet. In some aspects, a unit may have a header portion and a payload portion, such as a physical layer header portion and a physical layer payload portion. The header portion may include the (self-decodable) control information and the payload portion may include the (non-self-decodable) portion of the coded packet. The UE 115 may transmit the control information and the portion of the coded packet within a unit via contiguous time-frequency resources or via non-contiguous time-frequency resources. Accordingly, the UE 115 may transmit a unit via a contiguous time-frequency resource or via non-contiguous time-frequency resources.

Further, as described herein, "control information" may be referred to or understood as any information transmitted by the UE 115 that facilitates a joint decoding of multiple coded packet portions at the network entity 105. Thus, control information may include one or more fields or one or more bits of information. The control information may be understood as uplink control information (UCI) by way of being transmitted from the UE 115 to the network entity 105. The UE 115 may transmit the control information via a physical uplink shared channel (PUSCH), a physical uplink control channel (PUCCH), or any combination thereof. The UE 115 may transmit control information via one or more resources of the uplink resource pool that are dedicated to control information transmissions or via any available resources of the uplink resource pool.

Figure 2:
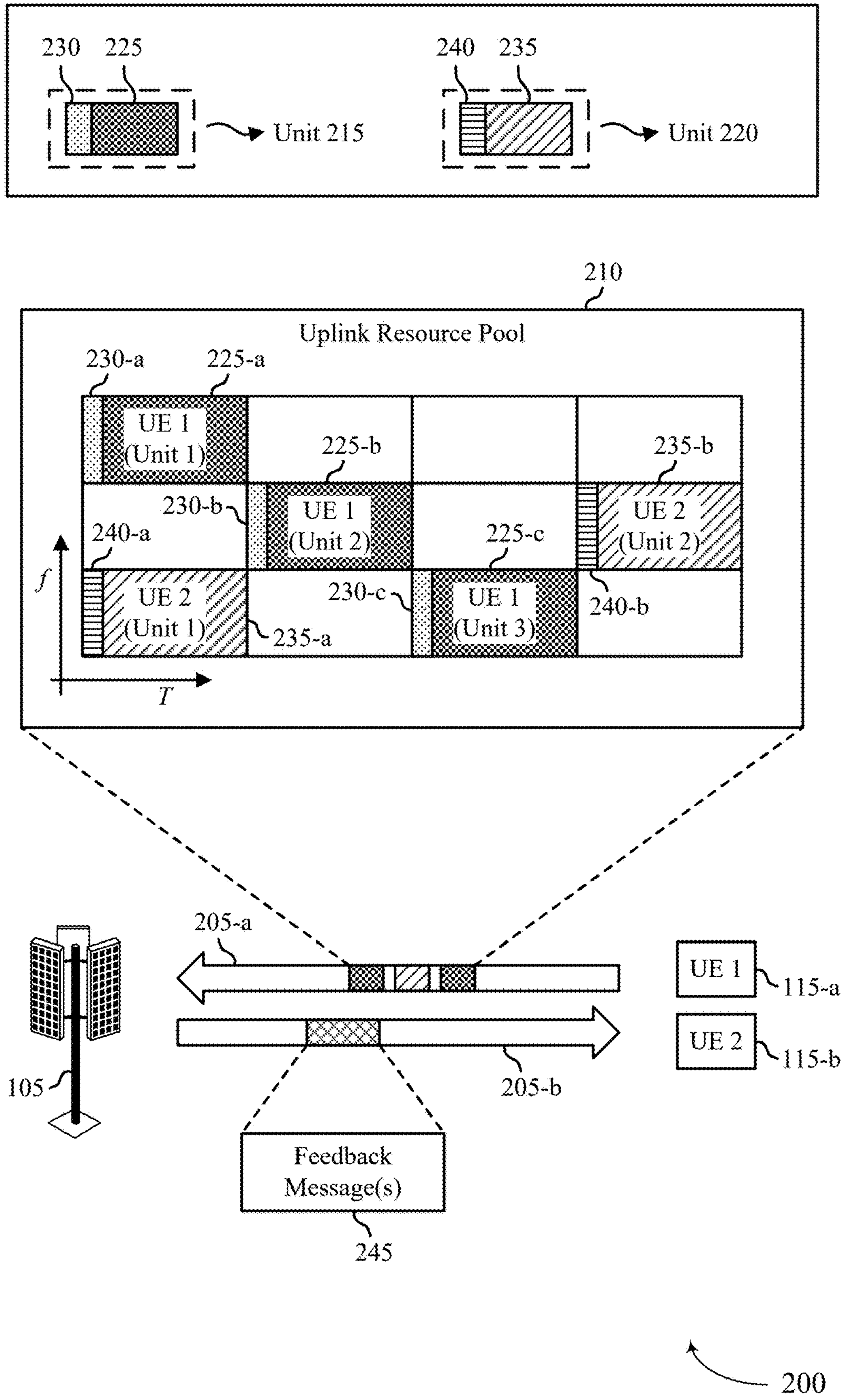
FIG. 2 shows an example signaling diagram that supports control information-based packet stitching of self-scheduled uplink transmissions in accordance with one or more aspects of the present disclosure.

FIG. 2 shows an example signaling diagram 200 that supports control information-based packet stitching of self-scheduled uplink transmissions in accordance with one or more aspects of the present disclosure. The signaling diagram 200 may implement or be implemented to realize one or more aspects of the wireless communications system 100. For example, the signaling diagram 200 illustrates communication between a network entity 105, a UE 115-*a* (illustrated as a "UE 1" in the example of the signaling diagram 200), and a UE 115-*b* (illustrated as a "UE 2" in the example of the signaling diagram 200), which may be examples of corresponding devices as illustrated and described herein, including by and with reference to FIG. 1.

As illustrated in the example of the signaling diagram 200, a UE 115 (e.g., the UE 115-*a* or the UE 115-*b*) may transmit uplink signaling via a communication link 205-*a* and the network entity 105 may transmit downlink signaling via a communication link 205-*b*. Accordingly, the communication link 205-*a* may be an example of an uplink and the communication link 205-*b* may be an example of a downlink.

In some implementations, the network entity 105, the UE 115-*a*, and the UE 115-*b* may support UE self-scheduled transmissions (e.g., self-scheduled uplink transmissions) to reduce an amount of downlink (e.g., scheduling) signaling from the network entity 105. For example, in some deployment scenarios, per UE 115 uplink scheduling from or by the network entity 105 may result in the network entity 105 transmitting a relatively large amount of signaling, particularly in scenarios of a relatively large quantity of UEs 115 (e.g., IoT devices within an IoT deployment scenario). In such deployment scenarios, UE self-scheduled uplink transmissions may reduce the amount of signaling overhead by or at the network entity 105. For example, instead of scheduling a set of one or more uplink transmissions from a set of one or more UEs 115, the network entity 105 may enable the set of UEs 115 to "self-schedule" their uplink transmissions (e.g., perform uplink transmissions without being explicitly or individually scheduled by the network entity 105). Thus, downlink control overhead may be reduced, which may increase power savings and resource savings at the network entity 105. The network entity 105 and one or more UEs 115 may support UE self-scheduled transmissions in various scenarios, including scenarios in which UE traffic is relatively sparse (such that uplink transmissions, from a specific UE 115 or from a set of UEs 115, are relatively infrequent).

In some examples, the network entity 105 may transmit control signaling (such as RRC signaling) that indicates an uplink resource pool 210 that the set of UEs 115 may use for self-scheduled transmissions. The uplink resource pool 210 may be a set of contiguous or non-contiguous time-frequency resources. For example, the network entity 105 may provide the uplink resource pool 210 for or as a configured grant (CG)-PUSCH and each UE 115 of the set of UEs 115 may select (such as randomly select) an uplink resource from the uplink resource pool 210 and transmit uplink data via the selected uplink resource. In other words, the network entity 105 may configure the uplink resource pool 210 and allocate each resource of the uplink resource pool 210 to multiple UEs 115 (e.g., as a resource pool as opposed to a per UE configuration of resources). In some aspects, the network entity 105 may configure and allocate multiple (heterogeneous) uplink resource pools 210 (which may be overlapping or non-overlapping with each other) to support payload and modulation and coding scheme (MCS) adaptation. The network entity 105 may control a probability of a UE 115 accessing the network entity 105 using a resource of the one or multiple uplink resource pools 210 or may adjust a size of the one or multiple uplink resource pools 210.

Additionally, in some examples, the network entity 105 may transmit information indicative of one or more parameters (such as one or more configurations, configuration parameters, transmission parameters, etc.) along with the information indicative of the uplink resource pool 210 and the set of UEs 115 may perform transmissions via an uplink resource of the uplink resource pool 210 in accordance with (such as based on or using) the one or more parameters. Accordingly, the network entity 105 may effectively provide one or more guidelines for UE self-scheduled transmissions and, generally, may not allow full flexibility for a UE 115 to schedule itself. In accordance with supporting UE self-scheduled transmissions, a UE 115 may refrain from waiting or may otherwise not expect to wait for an individual uplink grant for an uplink transmission. Instead, the UE 115 may transmit via one or more (randomly) selected resources from the uplink resource pool 210.

In some cases, a UE 115 may directly select a resource (e.g., a time-frequency resource) for (e.g., based on) a given payload size and may transmit a coded packet via the selected resource. UEs 115 may sometimes collide on resource usage, cause interference to each other, or otherwise degrade uplink performance. Given such possibilities in deployments involving UE self-scheduled transmissions, the network entity 105 may rely on or use a CRC pass to uniquely identify a transmission (e.g., a UE self-scheduled transmission). In some systems, the network entity 105 may configure the uplink resource pool 210, including a size of the uplink resource pool 210 (which may relate to whether over-provisioning is allowed), depending on one or more network or operator objectives, factors, or characteristics.

In accordance with UE self-scheduled transmission operation, transmitter (e.g., UE) behavior is relatively simple (e.g., select a resource to use with proper MCS and payload size) at the cost of receiver (e.g., gNB) complexity. For example, in accordance with UE self-scheduled transmission operation, the behavior at the network entity 105 may be relatively more processing heavy as the network entity 105 may be expected to perform blind channel estimation and blind decoding for each resource within the uplink resource pool 210. Thus, as a size of the uplink resource pool 210 increases, the processing burden at the network entity 105 may also increase.

In some systems, network side processing may be reduced by using a subpacket-based transmission scheme within or via the uplink resource pool 210. In accordance with a subpacket-based transmission scheme, an uplink data payload may be divided into multiple subpackets, each subpacket being confined to a time-frequency resource of the uplink resource pool 210 and independently (e.g., individually or separately) encoded. For example, in such systems, a UE 115 may divide an uplink data payload into multiple subpackets, with each subpacket being independently encoded (and likewise independently decoded) and being associated with (e.g., including) UE identifying information (e.g., via a cell radio network temporary identifier (C-RNTI)). Each subpacket may be associated with a respective CRC for independent decoding. For example, in such systems, the network entity 105 may decode each subpacket based on an independent CRC and (after decoding each subpacket) may combine multiple subpackets to form the original packet.

As a size of such subpackets becomes smaller (for example, as a single subpacket size in the uplink resource pool 210 becomes smaller), complexity at the network entity 105 may become simpler (at least from a blind decoding point of view). As the subpacket size becomes smaller, however, performance may be degraded compared to larger packet sizes due to a relatively smaller coding gain and relatively less frequency/time diversity. For example, because each subpacket is individually encoded/decoded and because each subpacket is transmitted by a UE 115 via a relatively smaller time-frequency resource, coded bits associated with a provided uplink data payload may be confined to the relatively smaller time-frequency resource and not spread across a larger range or spectrum of time-frequency resources. Thus, some systems may benefit from additional configuration- or signaling-based mechanisms according to which network side complexity can be reduced without sacrificing or compromising coding gain and frequency/time diversity.

Accordingly, in some implementations, various wireless communication devices (e.g., the network entity 105, the UE 115-*a*, and the UE 115-*b*) may employ a packet stitching-based mechanism according to which a UE 115 (e.g., the UE 115-*a* or the UE 115-*b*) may transmit an uplink data payload using multiple units and according to which the network entity 105 may stitch (e.g., combine, such as in an ordered manner) the units together using UE-provided control information. In such implementations, the network entity 105 may apply joint processing to decode the packet (e.g., in accordance with stitching the multiple units together). In some examples, a UE 115 may split a payload into multiple units and transmit each unit with separate control information such that the network entity 105 may stitch the units together using the control information for joint processing.

For example, the UE 115-*a* may generate, obtain, calculate, retrieve, or otherwise determine a first uplink data payload (which may be associated with an application at the UE 115-*a*), encode the first uplink data payload to generate or obtain a first coded packet, and transmit a set of units 215 associated with the first coded packet. Each unit 215 of the set of units 215 may include respective control information 230 and a respective portion 225 of the first coded packet. For example, and as illustrated in the example of the signaling diagram 200, a first unit 215 (e.g., a "Unit 1") may include a first portion 225-*a* of the first coded packet and first control information 230-*a*, a second unit 215 (e.g., a "Unit 2") may include a second portion 225-*b* of the first coded packet and second control information 230-*b*, and a third unit 215 (e.g., a "Unit 3") may include a third portion 225-*c* of the first coded packet and third control information 230-*c*. The UE 115-*a* may transmit the first unit 215 via a first time-frequency resource of the uplink resource pool 210, transmit the second unit 215 via a second time-frequency resource of the uplink resource pool 210, and transmit the third unit 215 via a third time-frequency resource of the uplink resource pool 210. In some examples, each of the set of units 215 may include a physical layer header portion and a physical layer payload portion, with the physical layer header portion of each unit 215 including the respective control information 230 and the physical layer payload portion of each unit 215 including the respective portion 225 of the first coded packet.

For further example, the UE 115-*b* may generate, obtain, calculate, retrieve, or otherwise determine a second uplink data payload (which may be associated with an application at the UE 115-*b*), encode the second uplink data payload to generate or obtain a second coded packet, and transmit a set of units 220 associated with the second coded packet. Each unit 220 of the set of units 220 may include respective control information 240 and a respective portion 235 of the second coded packet. For example, and as illustrated in the example of the signaling diagram 200, a first unit 220 (e.g., a "Unit 1") may include a first portion 235-*a* of the second coded packet and first control information 240-*a* and a second unit 220 (e.g., a "Unit 2") may include a second portion 235-*b* of the second coded packet and second control information 240-*b*. The UE 115-*b* may transmit the first unit 220 via a fourth time-frequency resource of the uplink resource pool 210 and may transmit the second unit 220 via a fifth time-frequency resource of the uplink resource pool 210. In some examples, each of the set of units 220 may include a physical layer header portion and a physical layer payload portion, with the physical layer header portion of each unit 220 including the respective control information 240 and the physical layer payload portion of each unit 220 including the respective portion 235 of the second coded packet.

The control information within each unit of a set of units may be self-decodable (e.g., independently, individually, or separately decodable) and may contain, include, or otherwise be associated with a separate, standalone, or independent CRC for independent decoding of that control information. For example, the first control information 230-*a*, the second control information 230-*b*, the third control information 230-*c*, the first control information 240-*a*, and the second control information 240-*b* may each be self-decodable in accordance with each having independent CRCs. In such examples, the network entity 105 may attempt to individually decode each of the first control information 230-*a*, the second control information 230-*b*, the third control information 230-*c*, the first control information 240-*a*, and the second control information 240-*b*.

In some implementations, the control information within each unit of a set of units may indicate at least a location of that unit within an ordered sequence of the set of units. For example, the first control information 230-*a* may indicate a first location of the first unit 215 within the ordered sequence of the set of units 215, the second control information 230-*b* may indicate a second location of the second unit 215 within the ordered sequence of the set of units 215, and the third control information 230-*c* may indicate a third location of the third unit 215 within the ordered sequence of the set of units 215. Additionally, or alternatively, the control information within each unit of a set of units may include or otherwise indicate information pertaining to a quantity of units within the set of units. For example, the first control information 230-*a*, the second control information 230-*b*, and the third control information 230-*c* may each indicate that there is a quantity of three units 215 associated with (e.g., conveying portions of) the first coded packet.

Additionally, or alternatively, the control information within each unit of a set of units may include or otherwise indicate a form of UE ID of the transmitting UE 115 (e.g., via a C-RNTI associated with that control information). For example, each of the first control information 230-*a*, the second control information 230-*b*, and the third control information 230-*c* may be associated with (e.g., have CRC scrambled by) a C-RNTI indicative of the UE 115-*a*. In such examples, the UE 115-*a* may distinguish the transmission of the first coded packet from transmissions by different users, such as from the transmission of the second coded packet by the UE 115-*b*. Additionally, or alternatively, the control information within each unit of a set of units may include or otherwise indicate a size (e.g., a quantity of time-frequency resources transmitted) and an MCS of the transmission of that unit. For example, the first control information 230-*a* may indicate a first size and a first MCS associated with the transmission of the first unit 215, the second control information 230-*b* may indicate a second size and a second MCS associated with the transmission of the second unit 215, and the third control information 230-*c* may indicate a third size and a third MCS associated with the transmission of the third unit 215.

Additionally, or alternatively, the control information within each unit of a set of units may include or otherwise indicate a time-frequency resource of one or more other units of the set of units. In some examples, the control information within each unit of a set of units may include or otherwise indicate a time-frequency resource of a next unit of the set of units. For example, the first control information 230-*a* of the first unit 215 may indicate the second time-frequency via which the second unit 215 is transmitted and the second control information 230-*b* of the second unit 215 may indicate the third time-frequency via which the third unit 215 is transmitted.

The network entity 105 may perform blind channel estimation and blind decoding across the time-frequency resources of the uplink resource pool 210, such as to at least detect whether a control information portion of a unit is transmitted within each time-frequency resource of the uplink resource pool 210. In examples in which the network entity 105 detects a control information portion of a unit within a time-frequency resource (e.g., at least in accordance with detecting a threshold amount of energy), the network entity 105 may attempt to decode the control information based on the independent CRC of the control information. Otherwise, in examples in which the network entity 105 does not detect a control information portion of a unit within a time-frequency resource, the network entity 105 may continue blind decoding across the time-frequency resource for other uplink data or may refrain from blind decoding a remainder of the time-frequency resource.

In some implementations, the network entity 105 may stitch multiple units together (e.g., multiple portions of a coded packet as received via the multiple units) to form a packet. Such a packet formed by the network entity 105 may be a complete form of a coded packet as generated by a UE 115 if the network entity 105 successfully receives each unit of a set of units associated with the coded packet or may be an incomplete form of the coded packet as generated by the UE 115 if the network entity 105 unsuccessfully receives at least one unit of the set of units associated with the coded packet. In other words, in some scenarios, there may be missed units at the network entity 105. In some implementations, the network entity 105 may detect or determine that the network entity 105 missed one or more units of a set of units associated with a coded packet based on the indications received via one or more control information portions of other units of the set of units. In some of such implementations, the network entity 105 may fill 0 log-likelihood ratios (LLRs) to the coded bits not received (e.g., missed).

In some aspects, the network entity 105 may stich multiple units together based on one or both of a user ID (e.g., a UE ID) and unit ID information as provided by the control information received via the multiple units. For example, the network entity 105 may stitch together or combine the first portion 225-*a*, the second portion 225-*b*, and the third portion 225-*c* of the first coded packet in accordance with the indications provided by the first control information 230-*a*, the second control information 230-*b*, and the third control information 230-*c*. For further example, the network entity 105 may stitch together or combine the first portion 235-*a* and the second portion 235-*b* of the second coded packet in accordance with the indications provided by the first control information 240-*a* and the second control information 240-*b*.

The network entity 105 may attempt to jointly decode the stitched together or combined multiple units to recover the coded packet. For example, the network entity 105 may attempt to decode (e.g., jointly decode) a combination, such as an ordered combination, of the first portion 225-*a*, the second portion 225-*b*, and the third portion 225-*c* of the first coded packet. For further example, the network entity 105 may attempt to decode (e.g., jointly decode) a combination, such as an ordered combination, of the first portion 235-*a* and the second portion 235-*b* of the second coded packet.

The network entity 105 may transmit one or more feedback messages 245 to one or both of the UE 115-*a* and the UE 115-*b* in association with receiving and attempting to decode the first coded packet (as conveyed via the three units 215) and the second coded packet (as conveyed via the two units 220). In examples in which the network entity 105 is able to successfully decode a coded packet based on combining multiple portions received via multiple units, the network entity 105 may transmit an acknowledgment (ACK) to the UE 115 that transmitted the coded packet (e.g., to stop or avoid a retransmission of the coded packet). For example, if the network entity 105 is able to successfully decode the first coded packet and the second coded packet, the network entity 105 may transmit an ACK to each of the UE 115-*a* and the UE 115-*b*.

In examples in which the network entity 105 experiences an unsuccessful decoding attempt, the network entity 105 may provide additional feedback via the one or more feedback messages 245. The feedback may be in accordance with or otherwise associated with the joint encoding of the packet transmitted via multiple units. For example, the one or more feedback messages 245 may include unit level feedback, such as indications of unit level retransmissions, based on the control information provided with each transmitted unit. Additionally, or alternatively, the one or more feedback messages 245 may include packet level feedback, potentially along with other feedback information. In some aspects, and in accordance with control information being included within each unit independently, a retransmission command provided by the one or more feedback messages 245 may be issued (e.g., transmitted, provided, or formatted) based on decoded control information. Additional details relating to such feedback and retransmission commands are illustrated and described herein, including by and with reference to FIGS. 3-5.

Figure 3:
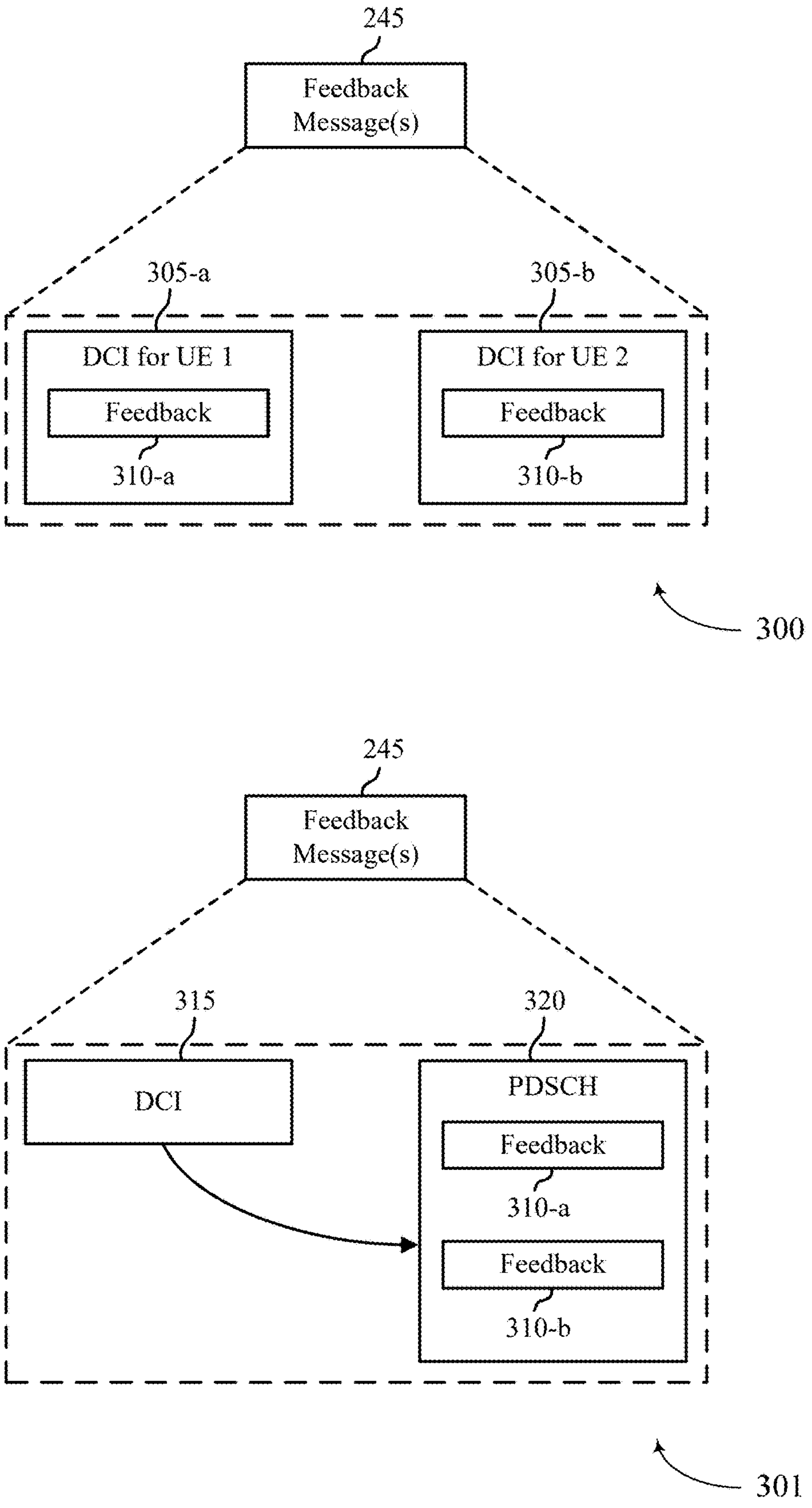
FIG. 3 shows example feedback messaging schemes that support control information-based packet stitching of self-scheduled uplink transmissions in accordance with one or more aspects of the present disclosure.

FIG. 3 shows example feedback messaging schemes 300 and 301 that support control information-based packet stitching of self-scheduled uplink transmissions in accordance with one or more aspects of the present disclosure. The feedback messaging schemes 300 and 301 may implement or be implemented to realize one or more aspects of the wireless communications system 100 or the signaling diagram 200. For example, the network entity 105 may transmit the one or more feedback messages 245 to the UE 115-*a* and the UE 115-*b*, as illustrated by and described with reference to FIG. 2, in accordance with one or both of the feedback messaging schemes 300 and 301.

In accordance with the feedback messaging scheme 300, the one or more feedback messages 245 may include one or more UE-specific DCI messages. The network entity 105 may transmit a DCI message for a UE 115 if at least one control information portion from the UE 115 is successfully decoded, but the coded packet is not successfully decoded, for (e.g., triggering, requesting, or scheduling) a retransmission of (a part of) the coded packet. For example, the one or more feedback messages 245 may include a DCI message 305-*a* including feedback 310-*a* for the UE 115-*a* (e.g., the "UE 1") and may include a DCI message 305-*b* including feedback 310-*b* for the UE 115-*b* (e.g., the "UE 2"). The feedback 310-*a* may be associated with the first coded packet transmitted by the UE 115-*a* and the feedback 310-*b* may be associated with the second coded packet transmitted by the UE 115-*b*. In some aspects, a CRC of a DCI message may be scrambled by a form of UE ID, such as a C-RNTI corresponding to a UE 115 or another form, kind, or type of transmission ID. For example, a CRC of the DCI message 305-*a* may be scrambled by a form of UE ID associated with the UE 115-*a* and the CRC of the DCI message 305-*b* may be scrambled by a form of UE ID associated with the UE 115-*b*.

In accordance with the feedback messaging scheme 301, the one or more feedback messages 245 may include a MAC control element (MAC-CE). For example, the network entity 105 may embed feedback (e.g., information indicative of an ACK or a negative ACK (NACK)) regarding one or multiple UEs 115 via a physical downlink shared channel (PDSCH) and inform the one or multiple UEs 115 of the PDSCH-carried feedback using a DCI message scrambled by an ID related to (e.g., associated with) the uplink resource pool 210, such as to an ID corresponding to the uplink resource pool 210 (e.g., a resource pool ID). The PDSCH may carry information to control the retransmission of one or more detected UEs 115, with a detected UE 115 being a UE 115 from which the network entity 105 detected (and successfully decoded) at least one unit transmission.

For example, the network entity 105 may transmit a DCI message 315 associated with (e.g., addressed to or decodable by) UEs 115 that perform UE self-scheduled transmissions and the DCI message 315 may indicate that feedback associated with one or more UE self-scheduled transmissions is transmitted via a PDSCH 320 (e.g., a MAC-CE sent via the PDSCH 320). The DCI message 315 may be referred to as a common or group common DCI because the DCI message 315 may be decodable by multiple UEs 115. In such examples, the network entity 105 may transmit the feedback 310-*a* associated with the first coded packet and the feedback 310-*b* associated with the second coded packet via the PDSCH 320. The UE 115-*a* and the UE 115-*b* may determine a location of the feedback 310-*a* and the feedback 310-*b*, respectively, via information provided by the DCI message 315, in accordance with a preconfigured ordering within the PDSCH 320, in accordance with one or more indications (e.g., UE IDs) within the PDSCH 320, or any combination thereof.

FIG. 4 shows example retransmission commands 400 and 401 that support control information-based packet stitching of self-scheduled uplink transmissions in accordance with one or more aspects of the present disclosure. The retransmission commands 400 and 401 may implement or be implemented to realize one or more aspects of the wireless communications system 100, the signaling diagram 200, or the feedback messaging schemes 300 or 301. For example, the network entity 105 may transmit the one or more feedback messages 245 to the UE 115-*a* and the UE 115-*b*, as illustrated by and described with reference to FIGS. 2-3, in accordance with one or both of the retransmission commands 400 and 401.

In accordance with the retransmission commands 400 and 401, feedback 310 (e.g., the feedback 310-*a* associated with the first coded packet or the feedback 310-*b* associated with the second coded packet) may include unit level retransmission information. To provide unit level retransmission information, the network entity 105 may indicate which units of a set of units are successfully received (control information within such units being successfully decoded) and which units of the set of units are not successfully received (control information within such units not being successfully decoded). For example, the feedback 310 may include a first set of indicators (e.g., fields or bits, such as 1-bit fields or indications) including a first indicator 405-*a*, a second indicator 405-*b*, and a third indicator 405-*c*, each indicator corresponding to a respective unit of a set of units associated with a coded packet.

In an example, the first indicator 405-*a* may correspond to (and provide feedback associated with) the first unit 215 (e.g., the first control information 230-*a* within the first unit 215), the second indicator 405-*b* may correspond to (and provide feedback associated with) the second unit 215 (e.g., the second control information 230-*b* within the second unit 215), and the third indicator 405-*c* may correspond to (and provide feedback associated with) the third unit 215 (e.g., the third control information 230-*c* within the third unit 215). In the example of the retransmission command 400, the first indicator 405-*a* may indicate that the first control information 230-*a* of the first unit 215 was successfully decoded, the second indicator 405-*b* may indicate that the second control information 230-*b* of the second unit 215 was successfully decoded, and the third indicator 405-*c* may indicate that the third control information 230-*c* of the third unit 215 was unsuccessfully decoded. In the example of the retransmission command 401, the first indicator 405-*a* may indicate that the first control information 230-*a* of the first unit 215 was successfully decoded, the second indicator 405-*b* may indicate that the second control information 230-*b* of the second unit 215 was successfully decoded, and the third indicator 405-*c* may indicate that the third control information 230-*c* of the third unit 215 was successfully decoded.

In some implementations, the network entity 105 may additionally allocate a bit of the feedback 310 to indicate whether a decoding of the coded packet (e.g., a joint decoding of a combination of the portions of the coded packet as obtained from the received units) is successful or unsuccessful. For example, the feedback 310 may include an indicator 410 that indicates whether the coded packet was successfully or unsuccessfully decoded. In the example of the retransmission command 400, the indicator 410 may indicate that the coded packet was unsuccessfully decoded. In the example of the retransmission command 401, the indicator 410 may indicate that the coded packet was successfully decoded. In some scenarios, a successful decoding of the control information within each of the units may not indicate a successful decoding of an entirety of the coded packet (as, for example, individual control information decoding may succeed while joint coded packet decoding fails).

In some implementations, the network entity 105 may indicate a transmit power control (TPC) command for a next (e.g., subsequent) transmission from the UE 115. Such a next transmission may be a retransmission of the previously transmitted coded packet or may be a transmission of a new coded packet. In such implementations, the feedback 310 may include a TPC command field 415. In the example of the retransmission command 400, the UE 115 may use a value indicated by the TPC command field 415 for a retransmission of (at least a portion of) the coded packet. In the example of the retransmission command 401, the UE 115 may use a value indicated by the TPC command field 415 for a transmission of a new coded packet. For example, if the UE 115 detects that a coded packet was successfully decoded by the network entity 105, the UE 115 may proceed with a new packet transmission with the received power control (e.g., using the value indicated by the TPC command field 415).

In examples in which the UE 115 receives information indicative of an unsuccessful detection of a transmitted coded packet with a unit level retransmission command, and in examples in which the control information of one or more units was unsuccessfully decoded, the UE 115 may proceed with a retransmission of the units of which the control information was unsuccessfully decoded (e.g., the remaining units). For example, if the UE 115 receives feedback 310 indicative of the retransmission command 400, the UE 115 may retransmit a third unit (e.g., a "Unit 3," such as the third unit 215) for which the third indicator 405-*c* indicates a NACK. In such examples, the UE 115 may refrain from retransmitting a first unit and a second unit (e.g., a "Unit 1" and a "Unit 2," such as the first unit 215 and the second unit 215) for which the first indicator 405-*a* and the second indicator 405-*b* indicate an ACK.

The UE 115 may use the received power control information to perform the retransmission of the units of which the control information was unsuccessfully decoded. In some implementations, the UE 115 may perform the retransmission of such one or more units via a set of time-frequency resources within a next instance of the uplink resource pool 210. Additionally, or alternatively, the UE 115 may perform the retransmission of such one or more units via one or more time-frequency resources within an (explicitly indicated) uplink grant (if an uplink grant assigning uplink resources to the UE 115 is received within the feedback 310).

In examples in which the UE 115 receives information indicative of an unsuccessful detection of a coded packet (e.g., of an entire coded packet) and indicative of a successful detection of the control information within each unit of a set of units associated with the coded packet, the UE 115 may proceed with a retransmission of the coded packet (e.g., the entire coded packet). The UE 115 may perform the retransmission of the coded packet via another set of multiple units. Further, in some implementations, the UE 115 may use the received power control information to perform the retransmission of the coded packet. The UE 115 may perform the retransmission of the coded packet via a set of time-frequency resources within a next instance of the uplink resource pool 210 or via one or more time-frequency resources within an (explicitly indicated) uplink grant (if an uplink grant assigning uplink resources to the UE 115 is received within the feedback 310).

Figure 5:
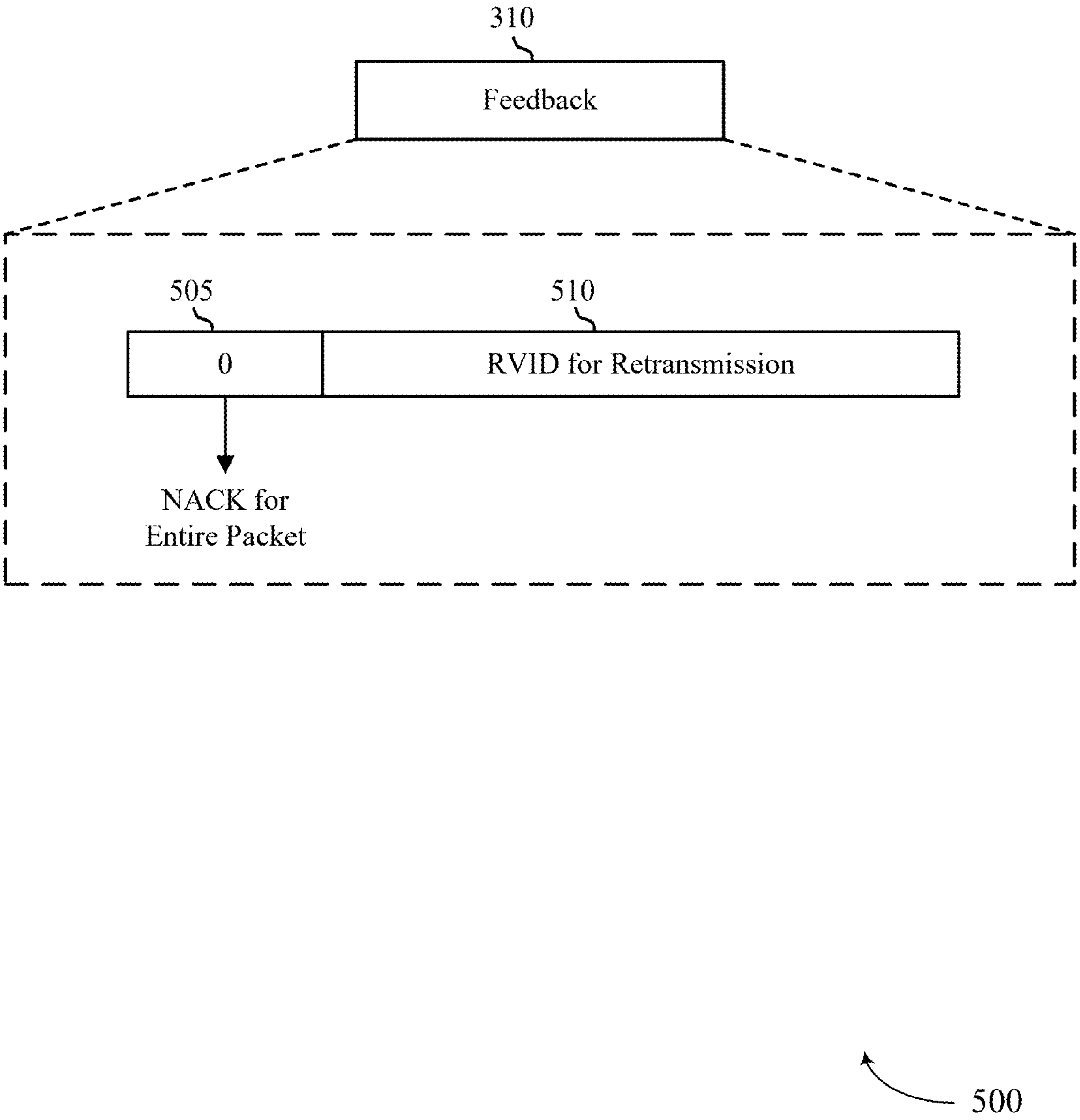

FIG. 5 shows an example retransmission command 500 that supports control information-based packet stitching of self-scheduled uplink transmissions in accordance with one or more aspects of the present disclosure. The retransmission command 500 may implement or be implemented to realize one or more aspects of the wireless communications system 100, the signaling diagram 200, the feedback messaging schemes 300 or 301, or the retransmission commands 400 or 401. For example, the network entity 105 may transmit the one or more feedback messages 245 to the UE 115-*a* and the UE 115-*b*, as illustrated by and described with reference to FIGS. 2-4, in accordance with the retransmission command 500.

In accordance with the retransmission command 500, the network entity 105 may indicate (e.g., instruct, command, trigger, or request) a UE 115 to perform a retransmission based on indicated RV information, such as based on an indicated RV ID (RVID) (e.g., based on an RVID retransmission). In other words, in accordance with the retransmission command 500, the feedback 310 may be associated with or include RVID level retransmission information. For example, in some implementations, the UE 115 may apply an interleaver before (e.g., prior to) distributing the entire packet bits into units. In other words, an interleaver at the UE 115 may distribute systematic bits into multiple units of a set of units associated with the entire (coded) packet. In some aspects, a collision of a unit may erase all of the received bits for the unit such that, without interleaving, there is a likelihood that a larger quantity of systematic bits may be erased (e.g., lost) in a collision.

Thus, in such scenarios (among other scenarios), the network entity 105 may indicate an RVID for a retransmission of a coded packet. Accordingly, the network entity 105 may indicate the UE 115 to retransmit using an RV with (e.g., associated with) a relatively larger quantity of systematics bits in scenarios in which multiple unit erasures occur. Alternatively, the network entity 105 may indicate the UE 115 to retransmit using an RV with (e.g., associated with) a relatively smaller quantity of systematics bits in scenarios in which, for example, a single or a relatively small quantity of unit erasures occur. To indicate an RVID for a retransmission of a coded packet, the feedback 310 (e.g., the feedback 310-*a* associated with the first coded packet or the feedback 310-*b* associated with the second coded packet) may include an indicator 505 indicating whether the coded packet was decoded successfully or unsuccessfully and an RVID field 510 indicating an RVID for the retransmission of the coded packet.

In examples in which the UE 115 receives feedback 310 indicative of the retransmission command 500, the UE 115 may retransmit a coded packet (e.g., via another set of multiple units) based on, using, or otherwise in accordance with the RVID indicated by the network entity 105 via the RVID field 510. The UE 115 may perform the retransmission of the coded packet via a set of time-frequency resources within a next instance of the uplink resource pool 210 (with power control information indicated by, for example, a TPC command field, if included within the feedback 310) or via one or more time-frequency resources within an (explicitly indicated) uplink grant (if an uplink grant assigning uplink resources to the UE 115 is received within the feedback 310).

Figure 6:
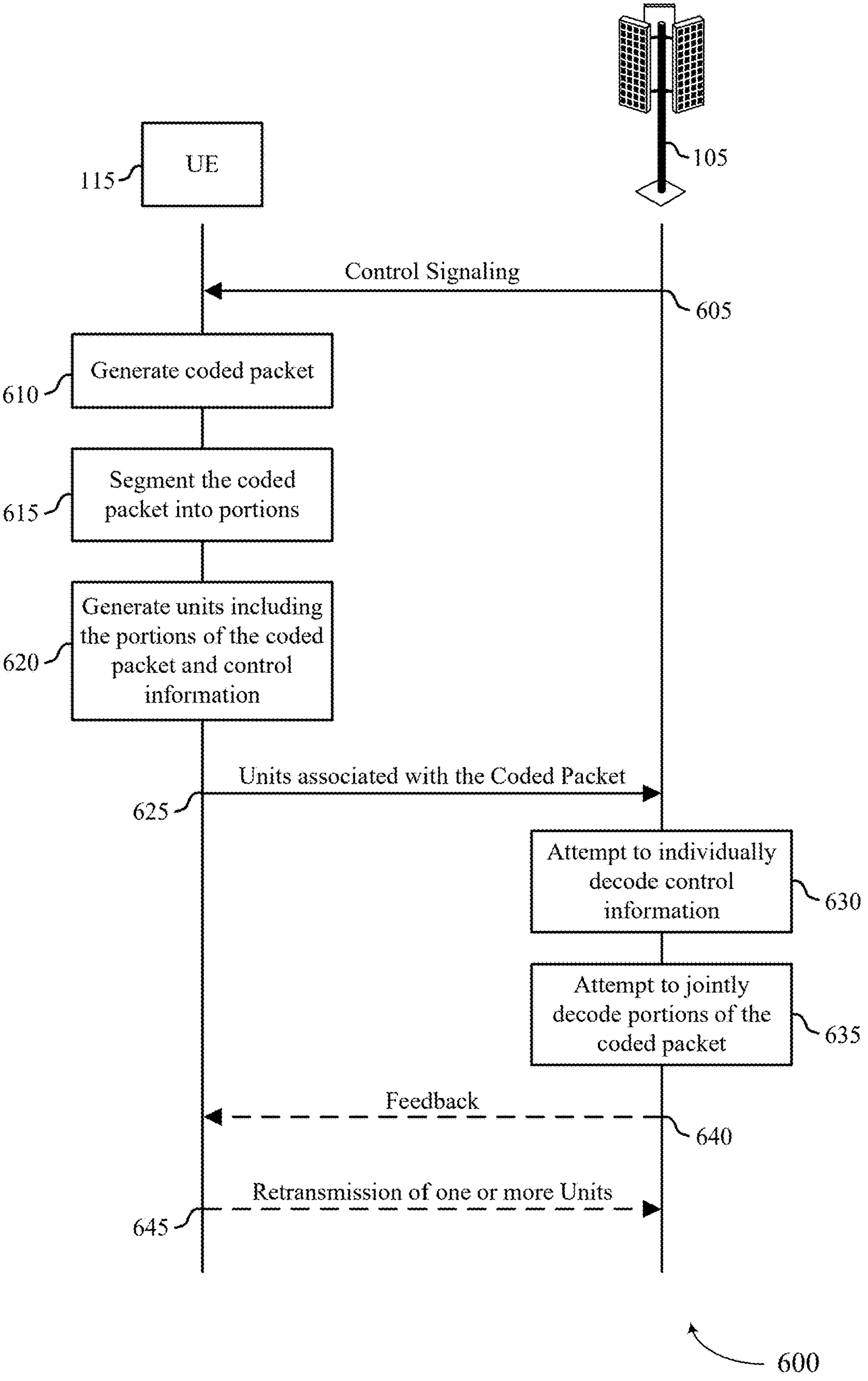
FIG. 6 shows an example process flow that supports control information-based packet stitching of self-scheduled uplink transmissions in accordance with one or more aspects of the present disclosure.

FIG. 6 shows an example process flow 600 that supports control information-based packet stitching of self-scheduled uplink transmissions in accordance with one or more aspects of the present disclosure. The process flow 600 may implement or be implemented to realize one or more aspects of the wireless communications system 100, the signaling diagram 200, the feedback messaging schemes 300 or 301, the retransmission commands 400 or 401, or the retransmission command 500. For example, the process flow 600 illustrates communication between a network entity 105 and a UE 115, which may be examples of corresponding devices as illustrated and described herein, including by and with reference to FIGS. 1-5.

Alternative examples of the following may be implemented. Some steps may be performed in a different order than described or may not be performed at all. In some implementations, steps may include additional features not mentioned below, or further steps may be added. Further, although example devices are shown performing the operations of the process flow 600, some aspects of some operations also may be performed by one or more other wireless communication devices without exceeding the scope of the present disclosure. For example, the network entity 105 may perform some aspects of some operations across multiple components, which may be disaggregated or collocated.

At 605, the UE 115 may receive, from the network entity 105, control signaling that indicates an uplink resource pool (e.g., an uplink resource pool 210) associated with UE self-scheduled transmissions. The control signaling may be or include RRC signaling or one or more MAC-CEs, or any combination thereof.

At 610, the UE 115 may generate a coded packet based on an uplink data payload at the UE 115. For example, the UE 115 may encode the uplink data payload to generate or obtain the coded packet. In some examples, the UE 115 may apply an interleaver as part of encoding the uplink data payload to distribute systematic bits associated with the uplink data payload throughout the coded packet.

At 615, the UE 115 may segment (e.g., separate or split) the coded packet into multiple portions such that, for example, the multiple portions may include at least a first portion of the coded packet and a second portion of the coded packet. In accordance with segmenting the coded packet to generate or obtain the portions of the coded packet, each portion may not be self-decodable (as, for example, encoding is performed prior to segmentation).

At 620, the UE 115 may generate multiple units associated with the coded packet, with each unit of the multiple units including a respective portion of the coded packet and respective control information. Each respective portion of the coded packet may not be self-decodable and each respective control information may be self-decodable. In some implementations, the respective control information within each unit may indicate at least a location of that unit within an ordered sequence of the multiple units. Additionally, or alternatively, the respective control information may include, be associated with, or otherwise indicate an independent CRC check, an ID of the UE 115, a quantity of the multiple units associated with the coded packet, a size or MCS associated with a time-frequency resource via which that unit is transmitted, one or more time-frequency resources via which one or more other units (e.g., a next unit) is transmitted, or any combination thereof.

At 625, the UE 115 may transmit, to the network entity 105, the multiple units via multiple time-frequency resources of the uplink resource pool. For example, the UE 115 may transmit a first unit (including a first portion of the coded packet and first control information) via a first time-frequency resource of the uplink resource pool and may transmit a second unit (including a second portion of the coded packet and second control information) via a second time-frequency resource of the uplink resource pool. Further, although described in some examples as time-frequency resources, a UE 115 as described herein may perform a (re)transmission via any wireless resource, such as a time domain resource, a frequency domain resource, a spatial domain resource, a code domain resource, or any combination thereof.

The network entity 105 may process the units associated with the coded packet (e.g., in accordance with performing blind channel estimation and blind decoding on the time-frequency resources of the uplink resource pool). In some aspects, the network entity 105 may process the units in association with (e.g., based on) attempting to individually decode the respective control information within each unit of the multiple units and attempting to jointly decode the portions of the coded packet in accordance with the ordered sequence of the multiple units. For example, at 630, the network entity 105 may attempt to individually decode the control information of each received unit and, at 635, the network entity 105 may attempt to jointly decode the portions of the coded packet. In some implementations, the network entity 105 may combine (e.g., stitch together) the received portions of the coded packet in accordance with the ordered sequence of the units associated with the coded packet. For example, if a first unit indicates that an included first portion of the coded packet is at a first location within the coded packet and if a second unit indicates that an included second portion of the coded packet is at a second location within the coded packet, the network entity 105 may combine the first and second portions of the coded packet in accordance with their respective locations within the coded packet to generate or obtain a received version of the (complete, non-segmented) coded packet. The network entity 105 may attempt to decode the received version of the (complete, non-segmented) coded packet accordingly.

At 640, the network entity 105 may transmit, to the UE 115, feedback corresponding to the units associated with the coded packet. The network entity 105 may transmit such feedback in accordance with various signaling mechanisms and to provide various indicators or retransmission commands, as illustrated and described in more detail herein, including by and with reference to FIGS. 2-5.

In some implementations, network entity 105 may include, within the feedback (e.g., within a retransmission command), a retransmission grant, which may grant one or more time-frequency resources (among other wireless resources) for the retransmission of the coded packet or of one or more units associated with the coded packet (e.g., the negatively acknowledged units or the negatively acknowledged coded packet). In other words, the network entity 105 may allocate an explicit uplink resource grant for the unit(s) for which control information was un-decoded (e.g., not successfully decoded) for the retransmission of such unit(s). In scenarios in which the network entity 105 successfully decodes the control information within all of the units associated with the coded packet, but unsuccessfully decodes the coded packet, the network entity 105 may assign one or more time-frequency resources for a retransmission of the entire coded packet (in units or as a complete, larger packet). In some other implementations, the network entity 105 may provide the feedback as (exclusively) an ACK/NACK indicator (e.g., without including an uplink grant for a retransmission). In such implementations, the network entity 105 may (implicitly) indicate that the UE 115 is to perform a retransmission in a next (e.g., subsequent) instance of the uplink resource pool or via other time-frequency resources of the uplink resource pool.

At 645, the UE 115 may selectively transmit, to the network entity 105, one or more units associated with the coded packet. The UE 115 may refrain from retransmitting any units associated with the coded packet if the feedback indicates that the network entity 105 successfully decoded the coded packet. Alternatively, the UE 115 may retransmit at least one unit associated with the coded packet if the feedback indicates that the network entity 105 unsuccessfully decoded the control information of least one unit or unsuccessfully decoded the coded packet. The UE 115 may retransmit a select subset of units associated with the coded packet in implementations in which the feedback provides a unit level retransmission indicator. Additionally, or alternatively, the UE 115 may retransmit a complete set of the units associated with the coded packet in implementations in which the feedback provides a packet level retransmission indicator or an RVID level retransmission indicator.

Further, in scenarios in which the UE 115 does not detect a retransmission command, the UE 115 may perform a retransmission of the units associated with the coded packet. The UE 115 may perform such a retransmission with a configured or predefined (e.g., as defined by, for example, an operator or a network specification) power boost. In some implementations, the UE 115 may initiate a random access procedure, such as a physical random access channel (PRACH) procedure, in accordance with experiencing (e.g., counting) a threshold quantity of unsuccessful (re)transmission attempts.

Figure 7:
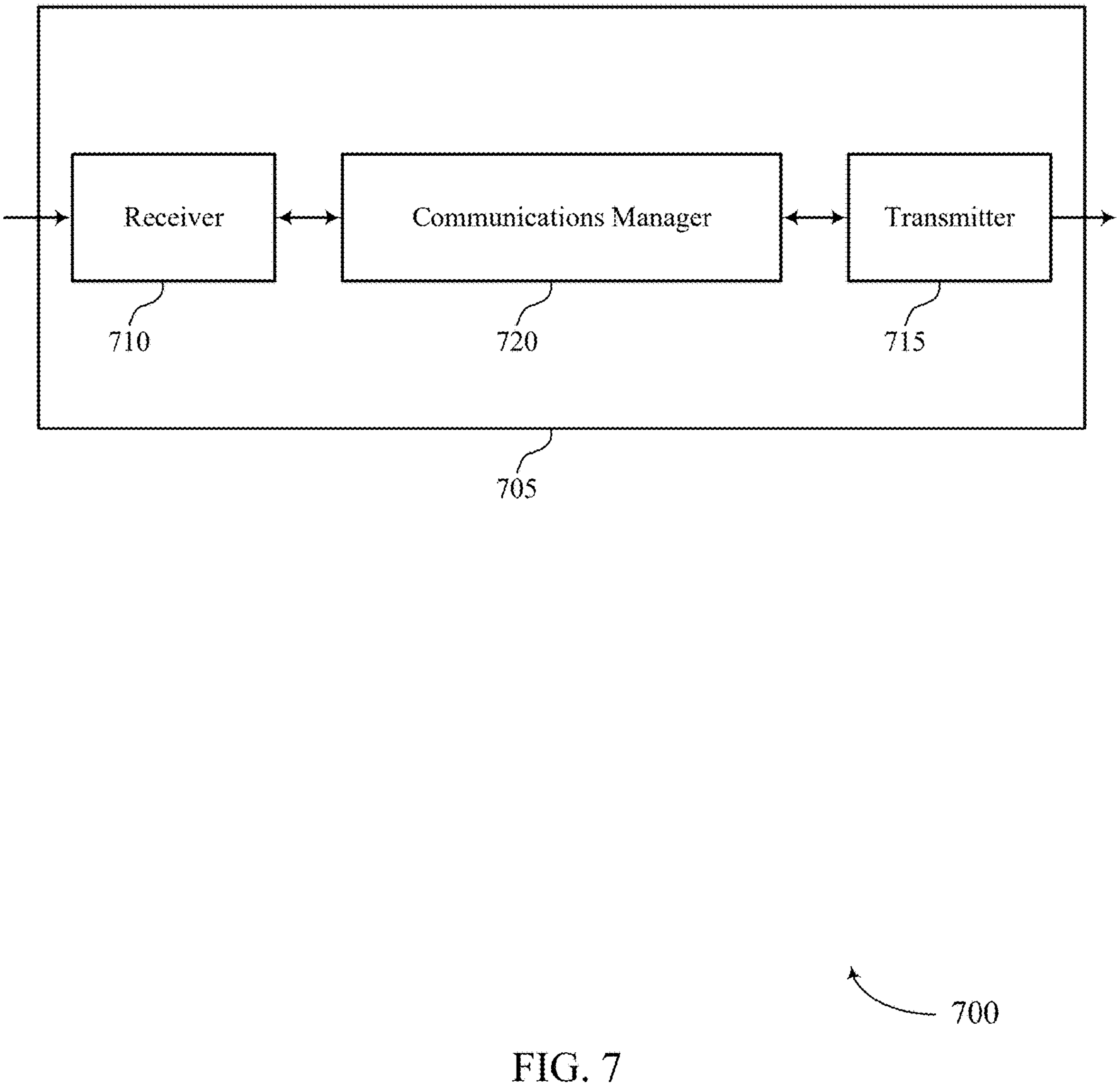
FIGS. 7 and 8 show block diagrams of devices that support control information-based packet stitching of self-scheduled uplink transmissions in accordance with one or more aspects of the present disclosure.

FIG. 7 shows a block diagram 700 of a device 705 that supports control information-based packet stitching of self-scheduled uplink transmissions in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to, individually or collectively, support or enable the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to control information-based packet stitching of self-scheduled uplink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to control information-based packet stitching of self-scheduled uplink transmissions). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations or components thereof may be examples of means for performing various aspects of control information-based packet stitching of self-scheduled uplink transmissions as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 720, the receiver 710, the transmitter 715, or various combinations or components thereof may be implemented in code (e.g., as communications management software or firmware) executed by at least one processor (e.g., referred to as a processor-executable code). If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication in accordance with examples as disclosed herein. For example, the communications manager 720 is capable of, configured to, or operable to support a means for receiving control signaling that indicates an uplink resource pool associated with UE self-scheduled transmissions. The communications manager 720 is capable of, configured to, or operable to support a means for generating a coded packet based on an uplink data payload. The communications manager 720 is capable of, configured to, or operable to support a means for transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing, reduced power consumption, and more efficient utilization of communication resources.

Figure 8:
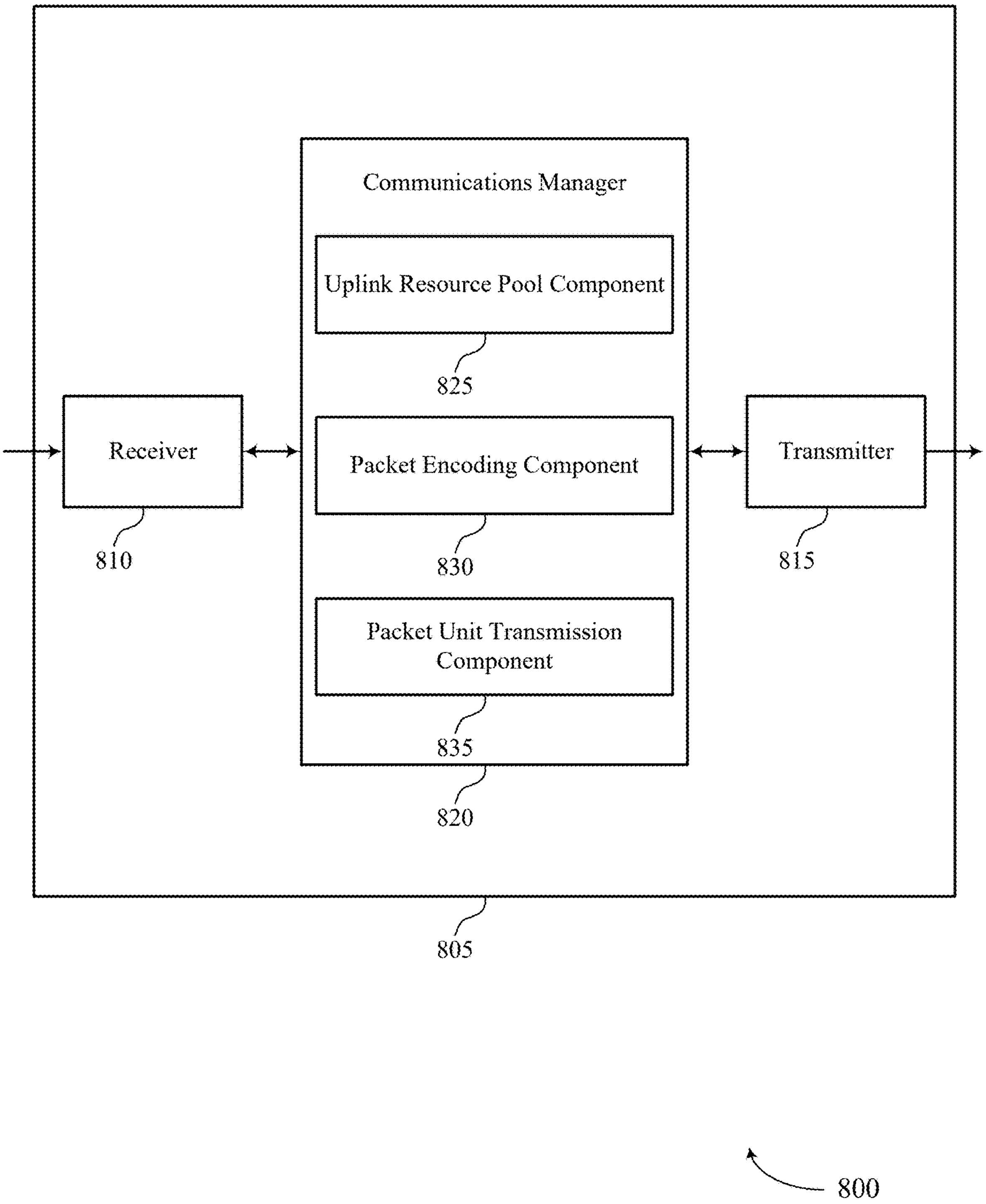

FIG. 8 shows a block diagram 800 of a device 805 that supports control information-based packet stitching of self-scheduled uplink transmissions in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to control information-based packet stitching of self-scheduled uplink transmissions). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to control information-based packet stitching of self-scheduled uplink transmissions). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of control information-based packet stitching of self-scheduled uplink transmissions as described herein. For example, the communications manager 820 may include an uplink resource pool component 825, a packet encoding component 830, a packet unit transmission component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. The uplink resource pool component 825 is capable of, configured to, or operable to support a means for receiving control signaling that indicates an uplink resource pool associated with UE self-scheduled transmissions. The packet encoding component 830 is capable of, configured to, or operable to support a means for generating a coded packet based on an uplink data payload. The packet unit transmission component 835 is capable of, configured to, or operable to support a means for transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

Figure 9:
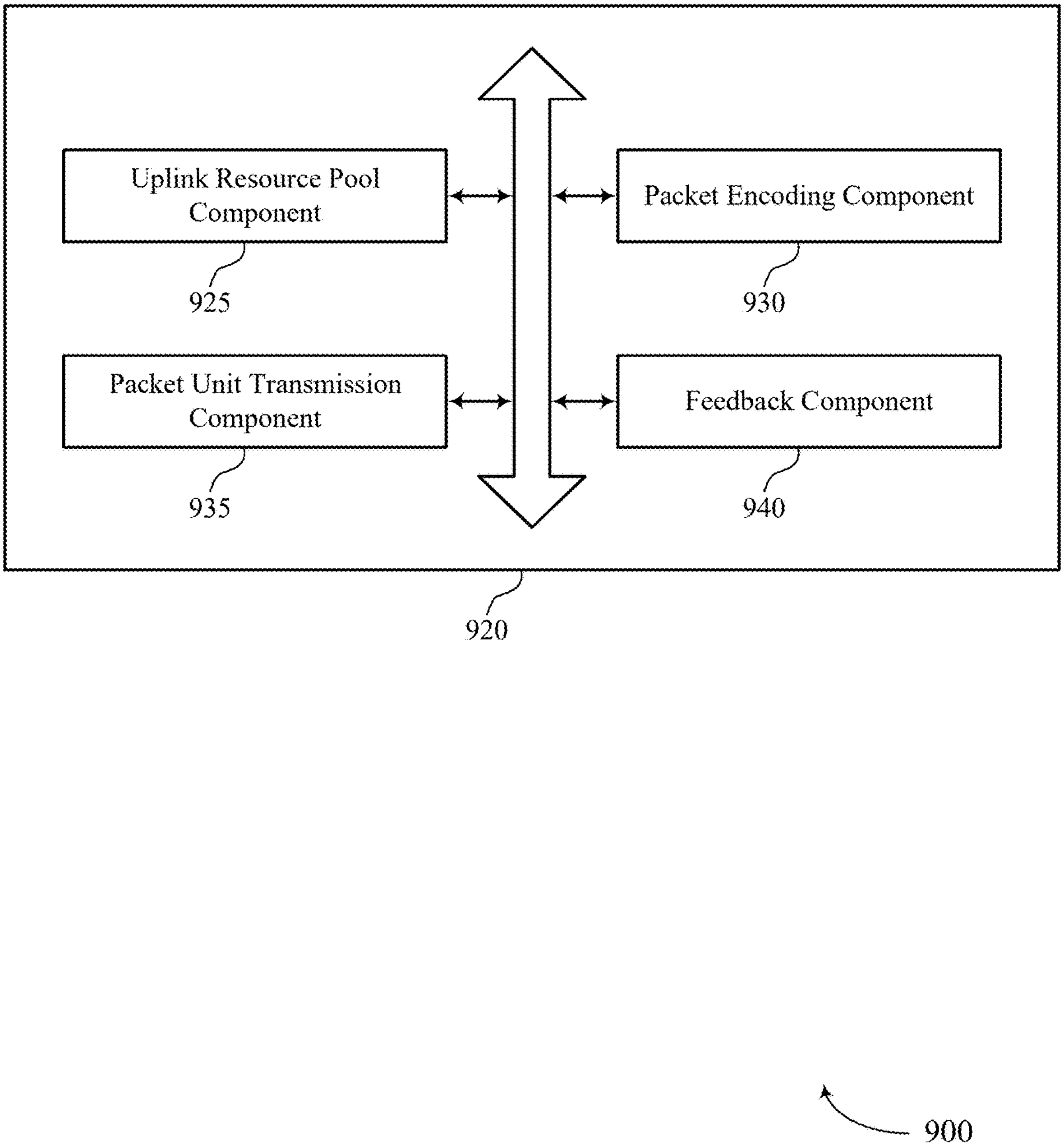
FIG. 9 shows a block diagram of a communications manager that supports control information-based packet stitching of self-scheduled uplink transmissions in accordance with one or more aspects of the present disclosure.

FIG. 9 shows a block diagram 900 of a communications manager 920 that supports control information-based packet stitching of self-scheduled uplink transmissions in accordance with one or more aspects of the present disclosure. The communications manager 920 may be an example of aspects of a communications manager 720, a communications manager 820, or both, as described herein. The communications manager 920, or various components thereof, may be an example of means for performing various aspects of control information-based packet stitching of self-scheduled uplink transmissions as described herein. For example, the communications manager 920 may include an uplink resource pool component 925, a packet encoding component 930, a packet unit transmission component 935, a feedback component 940, or any combination thereof. Each of these components, or components or subcomponents thereof (e.g., one or more processors, one or more memories), may communicate, directly or indirectly, with one another (e.g., via one or more buses).

The communications manager 920 may support wireless communication in accordance with examples as disclosed herein. The uplink resource pool component 925 is capable of, configured to, or operable to support a means for receiving control signaling that indicates an uplink resource pool associated with UE self-scheduled transmissions. The packet encoding component 930 is capable of, configured to, or operable to support a means for generating a coded packet based on an uplink data payload. The packet unit transmission component 935 is capable of, configured to, or operable to support a means for transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

In some examples, to support transmitting the set of multiple units associated with the coded packet, the packet unit transmission component 935 is capable of, configured to, or operable to support a means for transmitting a first unit associated with the coded packet via a first time-frequency resource of the set of multiple time-frequency resources, where the first unit includes first control information indicating at least a first location of the first unit within the ordered sequence of the set of multiple units and a first portion of the coded packet. In some examples, to support transmitting the set of multiple units associated with the coded packet, the packet unit transmission component 935 is capable of, configured to, or operable to support a means for transmitting a second unit associated with the coded packet via a second time-frequency resource of the set of multiple time-frequency resources, where the second unit includes second control information indicating at least a second location of the second unit within the ordered sequence of the set of multiple units and a second portion of the coded packet.

In some examples, the respective control information within each unit of the set of multiple units is associated with an independent cyclic redundancy check, the respective control information within each unit of the set of multiple units being self-decodable in accordance with being associated with the independent cyclic redundancy check. In some examples, the respective control information within each unit of the set of multiple units is associated with an identifier of the UE or indicates a quantity of the set of multiple units associated with the coded packet. In some examples, the respective control information within each unit of the set of multiple units indicates a size or a modulation and coding scheme associated with a time-frequency resource via which that unit of the set of multiple units is transmitted, or indicates one or more time-frequency resources of the set of multiple time-frequency resources via which one or more other units of the set of multiple units are transmitted.

In some examples, the feedback component 940 is capable of, configured to, or operable to support a means for receiving feedback corresponding to the set of multiple units associated with the coded packet. In some examples, the packet unit transmission component 935 is capable of, configured to, or operable to support a means for selectively retransmitting one or more units of the set of multiple units associated with the coded packet in accordance with the feedback.

In some examples, the feedback is received via a UE-specific downlink control information message. In some examples, the feedback is received via a downlink shared channel message that includes feedback associated with a set of multiple UEs including the UE. In some examples, the downlink shared channel message is scheduled by a downlink control information message scrambled by an identifier corresponding to the uplink resource pool associated with the UE self-scheduled transmissions.

In some examples, the feedback indicates, for each unit of the set of multiple units, whether the respective control information within that unit of the set of multiple units is successfully decoded or unsuccessfully decoded. In some examples, the feedback further indicates whether the coded packet is successfully decoded or unsuccessfully decoded. In some examples, the feedback indicates that the coded packet is unsuccessfully decoded and indicates a redundancy version identifier to be used for a retransmission of the set of multiple units associated with the coded packet.

In some examples, the feedback includes an uplink grant to be used for a retransmission of the one or more units of the set of multiple units associated with the coded packet. In some examples, the UE retransmits the one or more units of the set of multiple units via the uplink grant indicated by the feedback. In some examples, the feedback excludes an uplink grant to be used for a retransmission of the one or more units of the set of multiple units associated with the coded packet. In some examples, the UE retransmits the one or more units of the set of multiple units via one or more time-frequency resources of the uplink resource pool associated with the UE self-scheduled transmissions.

In some examples, the feedback indicates a transmit power control command associated with a retransmission of the one or more units of the set of multiple units.

In some examples, to support selectively retransmitting one or more units of the set of multiple units associated with the coded packet in accordance with the feedback, the packet unit transmission component 935 is capable of, configured to, or operable to support a means for retransmitting a subset of the set of multiple units associated with the coded packet in accordance with the feedback indicating that the respective control information within each unit of the subset of the set of multiple units was unsuccessfully decoded. In some examples, to support selectively retransmitting one or more units of the set of multiple units associated with the coded packet in accordance with the feedback, the packet unit transmission component 935 is capable of, configured to, or operable to support a means for retransmitting each unit of the set of multiple units associated with the coded packet in accordance with the feedback indicating that the coded packet was unsuccessfully decoded.

In some examples, to support selectively retransmitting one or more units of the set of multiple units associated with the coded packet in accordance with the feedback, the packet unit transmission component 935 is capable of, configured to, or operable to support a means for retransmitting each unit of the set of multiple units associated with the coded packet based on a redundancy version identifier in accordance with the feedback indicating that the coded packet is unsuccessfully decoded and indicating the redundancy version identifier. In some examples, to support selectively retransmitting one or more units of the set of multiple units associated with the coded packet in accordance with the feedback, the packet unit transmission component 935 is capable of, configured to, or operable to support a means for refraining from retransmitting the set of multiple units associated with the coded packet in accordance with the feedback indicating that the respective control information within each unit of the set of multiple units was successfully decoded and that the coded packet was successfully decoded.

In some examples, the respective control information within each unit of the set of multiple units is self-decodable. In some examples, the respective portion of the coded packet within each unit of the set of multiple units is not self-decodable. In some examples, the respective control information within each unit of the set of multiple units is included in a physical layer header of that unit of the set of multiple units.

Figure 10:
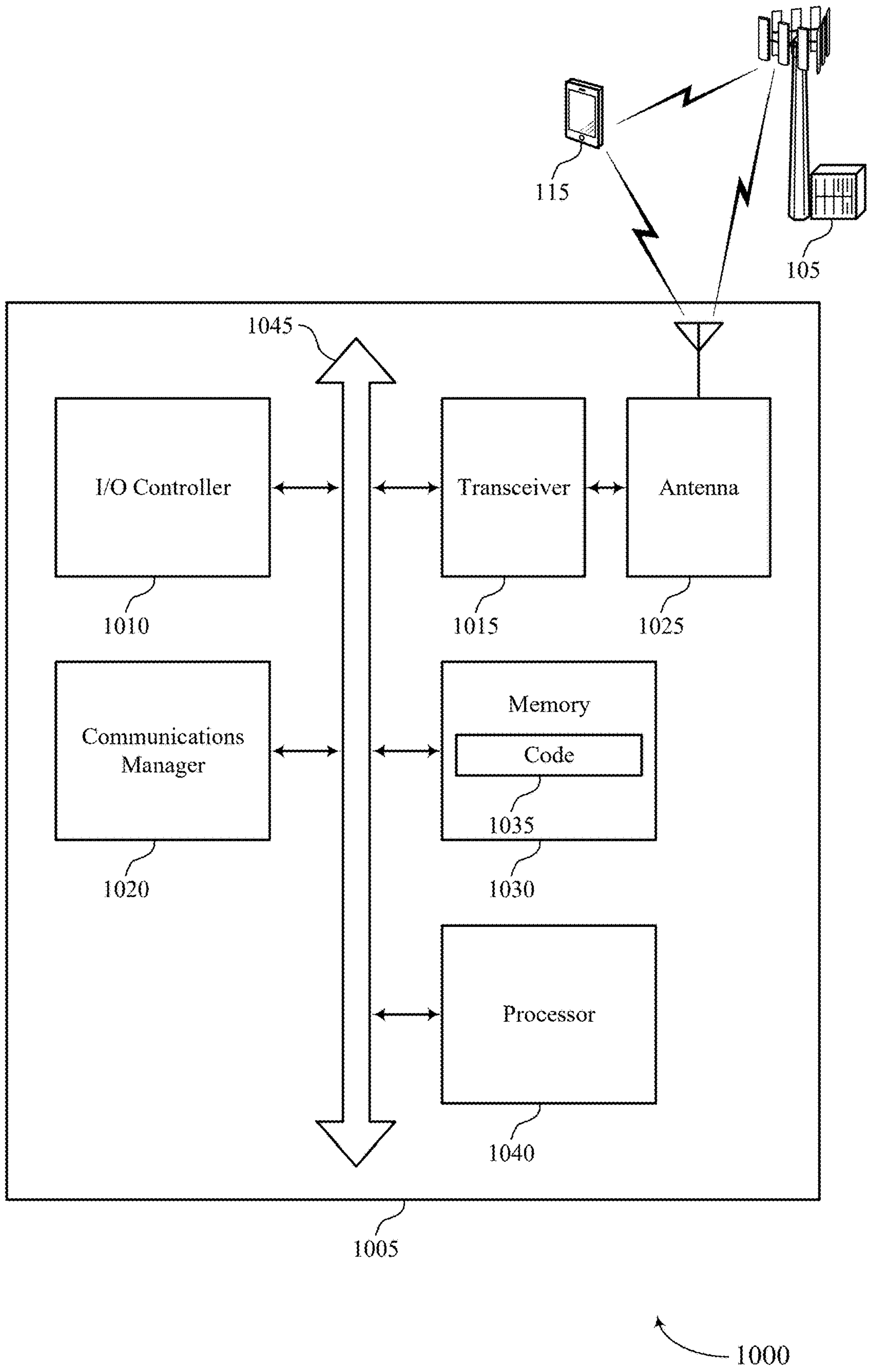
FIG. 10 shows a diagram of a system including a device that supports control information-based packet stitching of self-scheduled uplink transmissions in accordance with one or more aspects of the present disclosure.

FIG. 10 shows a diagram of a system 1000 including a device 1005 that supports control information-based packet stitching of self-scheduled uplink transmissions in accordance with one or more aspects of the present disclosure. The device 1005 may be an example of or include components of a device 705, a device 805, or a UE 115 as described herein. The device 1005 may communicate (e.g., wirelessly) with one or more other devices (e.g., network entities 105, UEs 115, or a combination thereof). The device 1005 may include components for bi-directional voice and data communications including components for transmitting and receiving communications, such as a communications manager 1020, an input/output (I/O) controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a basic I/O system (BIOS) which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting control information-based packet stitching of self-scheduled uplink transmissions). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

The communications manager 1020 may support wireless communication in accordance with examples as disclosed herein. For example, the communications manager 1020 is capable of, configured to, or operable to support a means for receiving control signaling that indicates an uplink resource pool associated with UE self-scheduled transmissions. The communications manager 1020 is capable of, configured to, or operable to support a means for generating a coded packet based on an uplink data payload. The communications manager 1020 is capable of, configured to, or operable to support a means for transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of control information-based packet stitching of self-scheduled uplink transmissions as described herein, or the at least one processor 1040 and the at least one memory 1030 may be otherwise configured to, individually or collectively, perform or support such operations.

Figure 11:
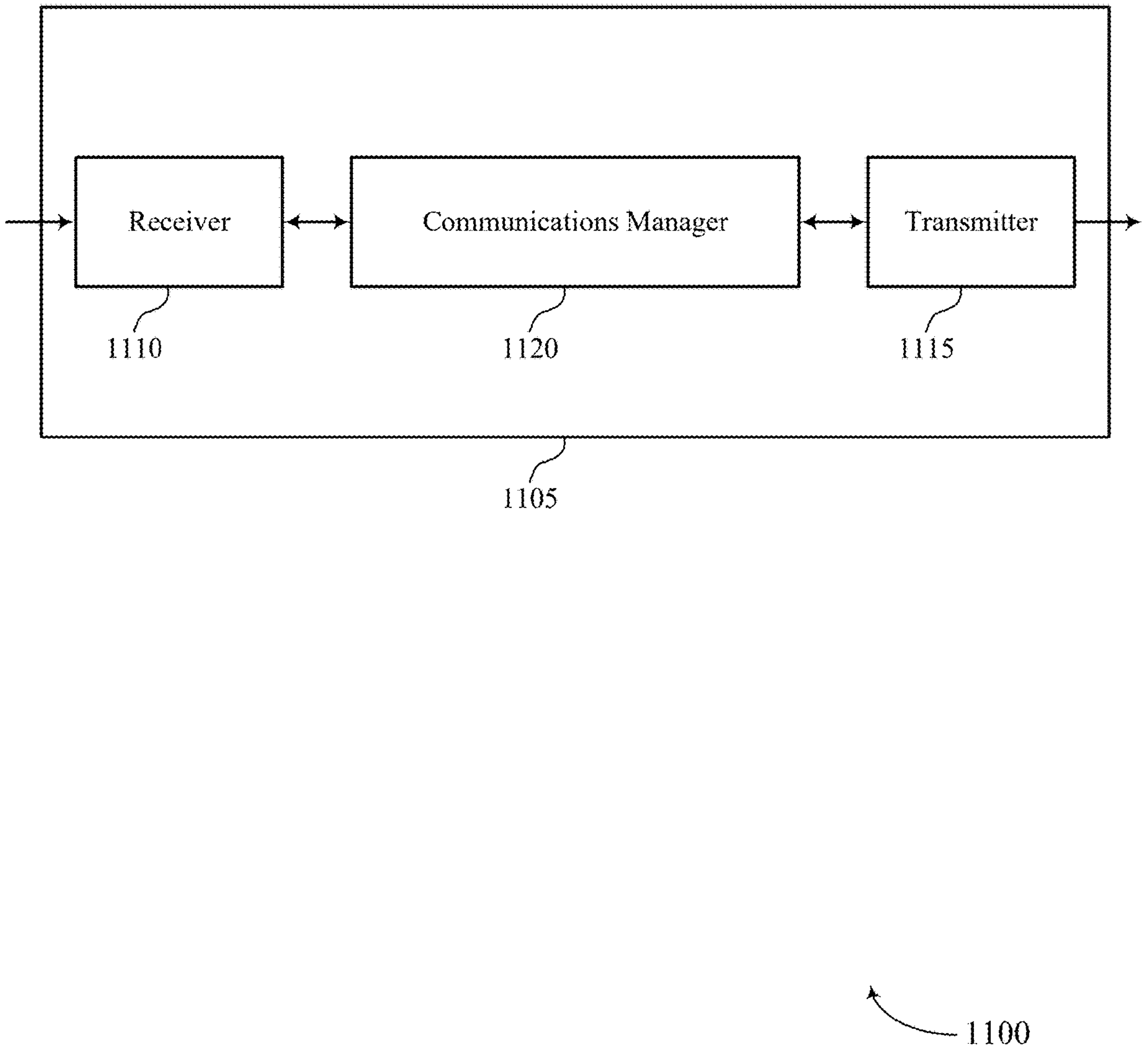
FIGS. 11 and 12 show block diagrams of devices that support control information-based packet stitching of self-scheduled uplink transmissions in accordance with one or more aspects of the present disclosure.

FIG. 11 shows a block diagram 1100 of a device 1105 that supports control information-based packet stitching of self-scheduled uplink transmissions in accordance with one or more aspects of the present disclosure. The device 1105 may be an example of aspects of a network entity 105 as described herein. The device 1105 may include a receiver 1110, a transmitter 1115, and a communications manager 1120. The device 1105, or one or more components of the device 1105 (e.g., the receiver 1110, the transmitter 1115, the communications manager 1120), may include at least one processor, which may be coupled with at least one memory, to, individually or collectively, support or enable the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations or components thereof may be examples of means for performing various aspects of control information-based packet stitching of self-scheduled uplink transmissions as described herein. For example, the communications manager 1120, the receiver 1110, the transmitter 1115, or various combinations or components thereof may be capable of performing one or more of the functions described herein.

In some examples, the communications manager 1120, the receiver 1110, the transmitter 1115, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1120, the receiver 1110, the transmitter 1115, or various combinations or components thereof may be implemented in code (e.g., as communications management software or firmware) executed by at least one processor (e.g., referred to as a processor-executable code). If implemented in code executed by at least one processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication in accordance with examples as disclosed herein. For example, the communications manager 1120 is capable of, configured to, or operable to support a means for transmitting control signaling that indicates an uplink resource pool associated with UE self-scheduled transmissions. The communications manager 1120 is capable of, configured to, or operable to support a means for receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet. The communications manager 1120 is capable of, configured to, or operable to support a means for processing the set of multiple units in association with attempting to individually decode the respective control information within each unit of the set of multiple units and attempting to jointly decode the set of multiple portions of the coded packet in accordance with the ordered sequence of the set of multiple units.

By including or configuring the communications manager 1120 in accordance with examples as described herein, the device 1105 (e.g., at least one processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
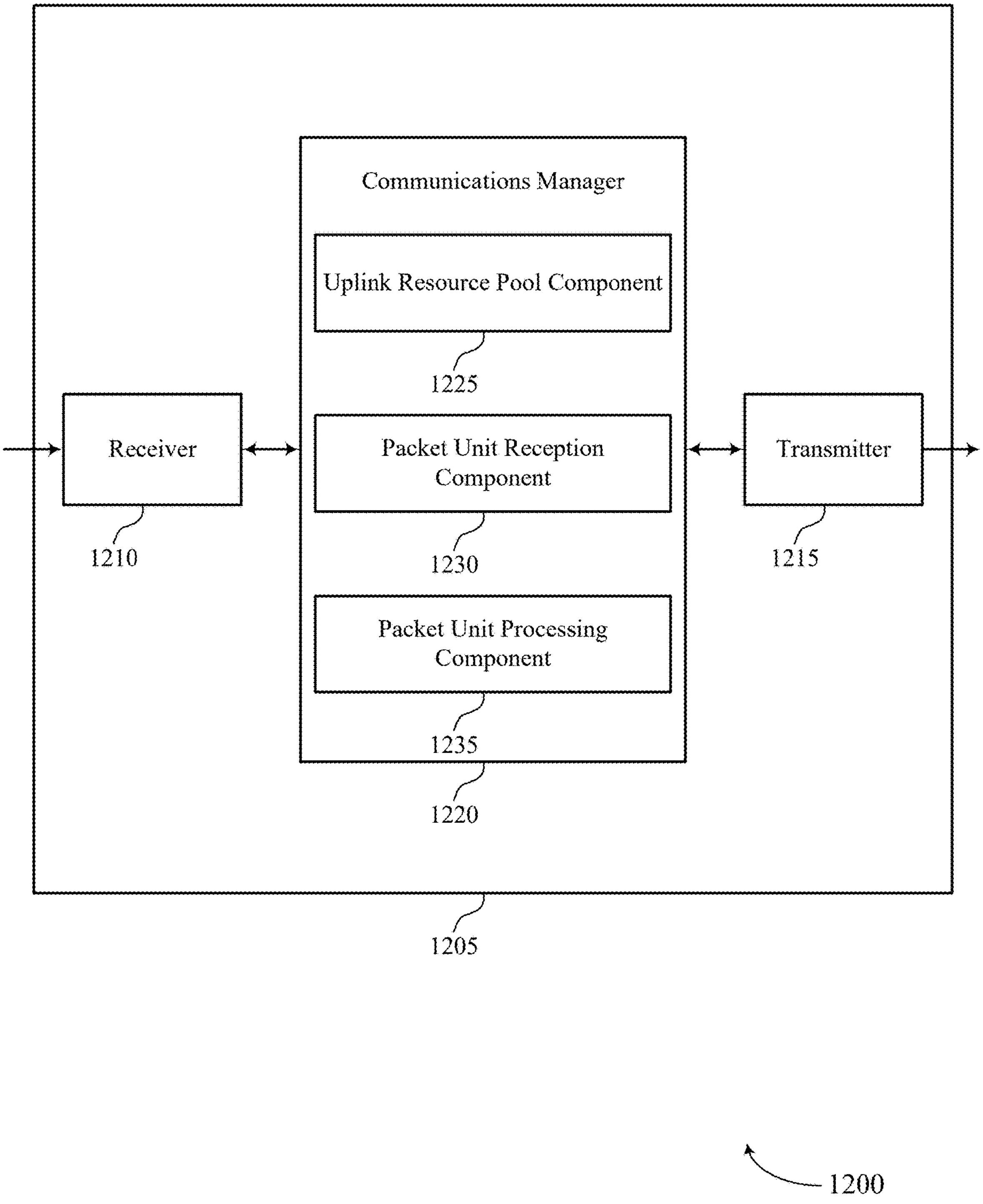

FIG. 12 shows a block diagram 1200 of a device 1205 that supports control information-based packet stitching of self-scheduled uplink transmissions in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205, or one or more components of the device 1205 (e.g., the receiver 1210, the transmitter 1215, the communications manager 1220), may include at least one processor, which may be coupled with at least one memory, to support the described techniques. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of control information-based packet stitching of self-scheduled uplink transmissions as described herein. For example, the communications manager 1220 may include an uplink resource pool component 1225, a packet unit reception component 1230, a packet unit processing component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication in accordance with examples as disclosed herein. The uplink resource pool component 1225 is capable of, configured to, or operable to support a means for transmitting control signaling that indicates an uplink resource pool associated with UE self-scheduled transmissions. The packet unit reception component 1230 is capable of, configured to, or operable to support a means for receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet. The packet unit processing component 1235 is capable of, configured to, or operable to support a means for processing the set of multiple units in association with attempting to individually decode the respective control information within each unit of the set of multiple units and attempting to jointly decode the set of multiple portions of the coded packet in accordance with the ordered sequence of the set of multiple units.

Figure 13:
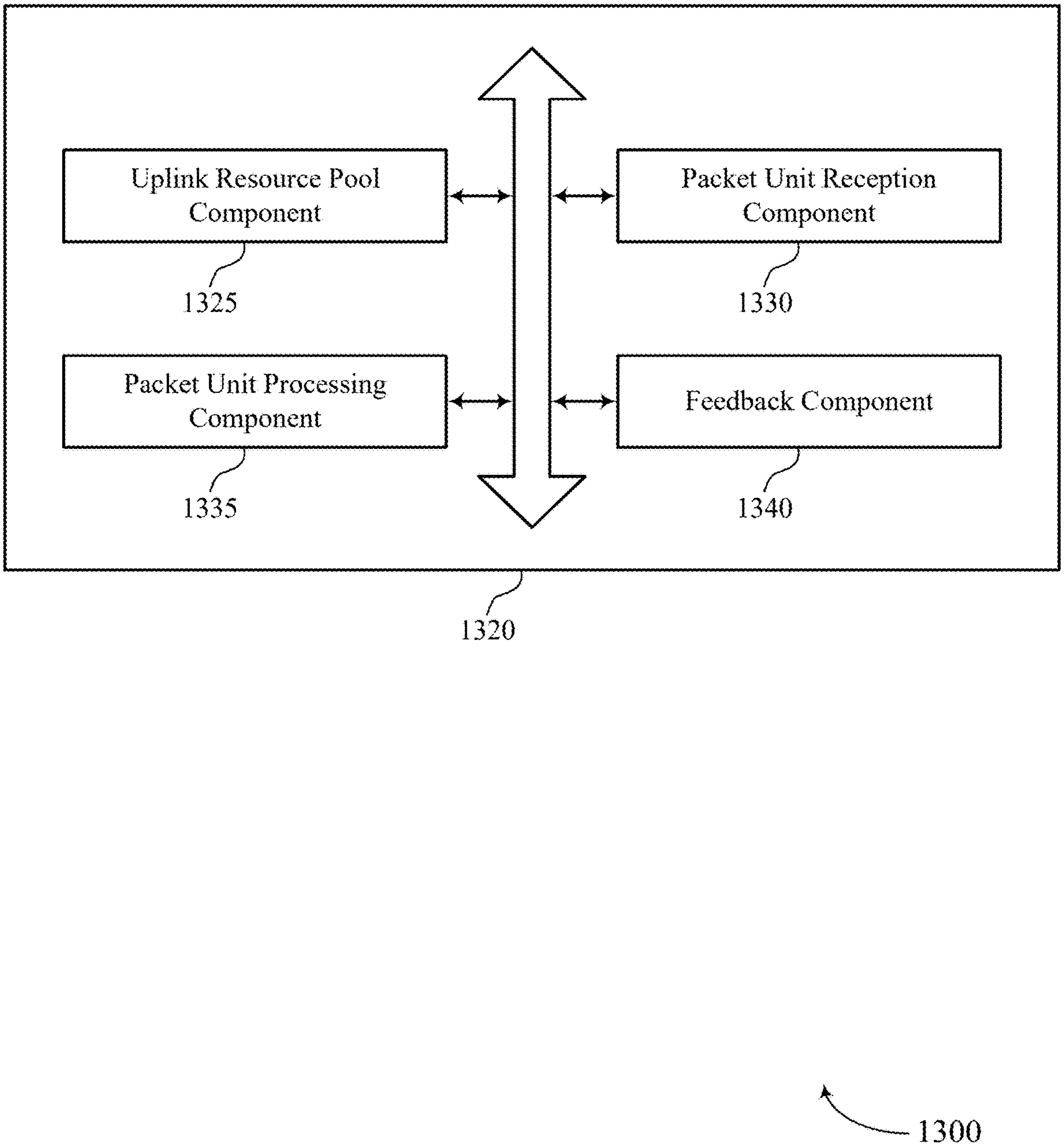
FIG. 13 shows a block diagram of a communications manager that supports control information-based packet stitching of self-scheduled uplink transmissions in accordance with one or more aspects of the present disclosure.

FIG. 13 shows a block diagram 1300 of a communications manager 1320 that supports control information-based packet stitching of self-scheduled uplink transmissions in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of control information-based packet stitching of self-scheduled uplink transmissions as described herein. For example, the communications manager 1320 may include an uplink resource pool component 1325, a packet unit reception component 1330, a packet unit processing component 1335, a feedback component 1340, or any combination thereof. Each of these components, or components or sub-components thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication in accordance with examples as disclosed herein. The uplink resource pool component 1325 is capable of, configured to, or operable to support a means for transmitting control signaling that indicates an uplink resource pool associated with UE self-scheduled transmissions. The packet unit reception component 1330 is capable of, configured to, or operable to support a means for receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet. The packet unit processing component 1335 is capable of, configured to, or operable to support a means for processing the set of multiple units in association with attempting to individually decode the respective control information within each unit of the set of multiple units and attempting to jointly decode the set of multiple portions of the coded packet in accordance with the ordered sequence of the set of multiple units.

In some examples, to support receiving the set of multiple units associated with the coded packet via the set of multiple time-frequency resources, the packet unit reception component 1330 is capable of, configured to, or operable to support a means for receiving a first unit associated with the coded packet via a first time-frequency resource of the set of multiple time-frequency resources, where the first unit includes first control information indicating at least a first location of the first unit within the ordered sequence of the set of multiple units and a first portion of the coded packet. In some examples, to support receiving the set of multiple units associated with the coded packet via the set of multiple time-frequency resources, the packet unit reception component 1330 is capable of, configured to, or operable to support a means for receiving a second unit associated with the coded packet via a second time-frequency resource of the set of multiple time-frequency resources, where the second unit includes second control information indicating at least a second location of the second unit within the ordered sequence of the set of multiple units and a second portion of the coded packet.

In some examples, to support processing the set of multiple units, the packet unit processing component 1335 is capable of, configured to, or operable to support a means for attempting to decode the first control information in accordance with a first independent cyclic redundancy check associated with the first control information. In some examples, to support processing the set of multiple units, the packet unit processing component 1335 is capable of, configured to, or operable to support a means for attempting to decode the second control information in accordance with a second independent cyclic redundancy check associated with the second control information. In some examples, to support processing the set of multiple units, the packet unit processing component 1335 is capable of, configured to, or operable to support a means for attempting to decode an ordered combination of the first portion of the coded packet and the second portion of the coded packet in accordance with the first control information and the second control information.

In some examples, the respective control information within each unit of the set of multiple units is associated with an independent cyclic redundancy check, the respective control information within each unit of the set of multiple units being self-decodable in accordance with being associated with the independent cyclic redundancy check. In some examples, the respective control information within each unit of the set of multiple units is associated with an identifier of a UE or indicates a quantity of the set of multiple units associated with the coded packet. In some examples, processing the set of multiple units is in accordance with the identifier of the UE or the quantity of the set of multiple units.

In some examples, the respective control information within each unit of the set of multiple units indicates a size or a modulation and coding scheme associated with a time-frequency resource via which that unit of the set of multiple units is transmitted, or indicates one or more time-frequency resources of the set of multiple time-frequency resources via which one or more other units of the set of multiple units are transmitted.

In some examples, the feedback component 1340 is capable of, configured to, or operable to support a means for transmitting feedback corresponding to the set of multiple units associated with the coded packet. In some examples, the packet unit reception component 1330 is capable of, configured to, or operable to support a means for selectively receiving a retransmission of one or more units of the set of multiple units associated with the coded packet in accordance with the feedback.

In some examples, the feedback is transmitted via a UE-specific downlink control information message. In some examples, the feedback is transmitted via a downlink shared channel message that includes feedback associated with a set of multiple UEs. In some examples, the downlink shared channel message is scheduled by a downlink control information message scrambled by an identifier corresponding to the uplink resource pool associated with the UE self-scheduled transmissions.

In some examples, the feedback indicates, for each unit of the set of multiple units, whether the respective control information within that unit of the set of multiple units is successfully decoded or unsuccessfully decoded. In some examples, the feedback further indicates whether the coded packet is successfully decoded or unsuccessfully decoded. In some examples, the feedback indicates that the coded packet is unsuccessfully decoded and indicates a redundancy version identifier to be used for the retransmission of the set of multiple units associated with the coded packet.

In some examples, the feedback includes an uplink grant to be used for the retransmission of the one or more units of the set of multiple units associated with the coded packet. In some examples, the network entity receives the retransmission of the one or more units of the set of multiple units via the uplink grant indicated by the feedback. In some examples, the feedback excludes an uplink grant to be used for the retransmission of the one or more units of the set of multiple units associated with the coded packet. In some examples, the network entity receives the retransmission of the one or more units of the set of multiple units via one or more time-frequency resources of the uplink resource pool associated with the UE self-scheduled transmissions.

In some examples, the feedback indicates a transmit power control command associated with the retransmission of the one or more units of the set of multiple units. In some examples, the one or more units of the set of multiple units associated with the coded packet include a subset of the set of multiple units associated with the coded packet in accordance with the feedback indicating that the respective control information within each unit of the subset of the set of multiple units was unsuccessfully decoded, or include a complete set of the set of multiple units associated with the coded packet in accordance with the feedback indicating that the coded packet was unsuccessfully decoded.

In some examples, the feedback indicates that the respective control information within each unit of the set of multiple units was successfully decoded or that the coded packet was successfully decoded. In some examples, the retransmission of the one or more units of the set of multiple units includes is not performed in accordance with the feedback. In some examples, the respective control information within each unit of the set of multiple units is self-decodable. In some examples, the respective portion of the coded packet within each unit of the set of multiple units is not self-decodable. In some examples, the respective control information within each unit of the set of multiple units is included in a physical layer header of that unit of the set of multiple units.

Figure 14:
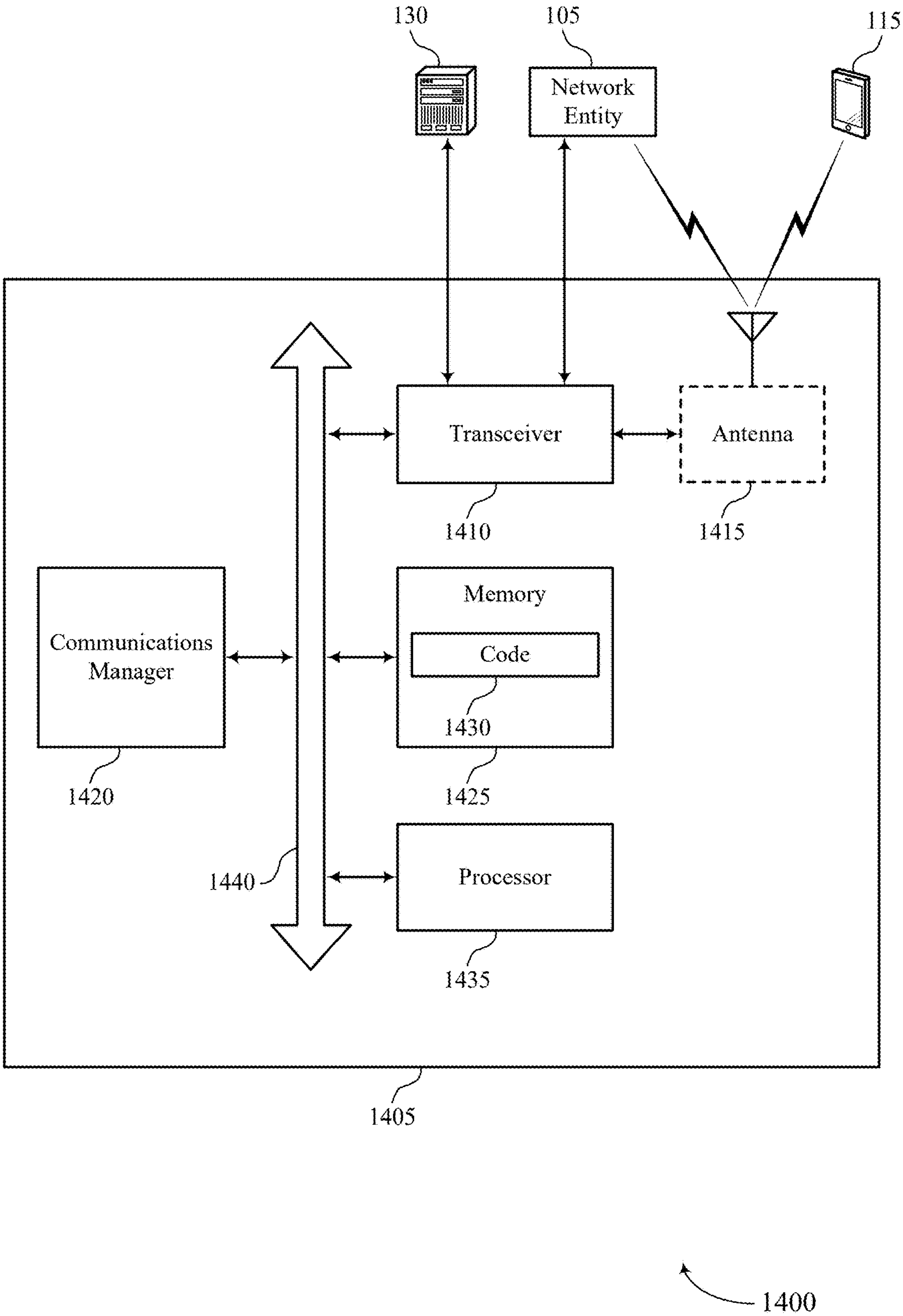
FIG. 14 shows a diagram of a system including a device that supports control information-based packet stitching of self-scheduled uplink transmissions in accordance with one or more aspects of the present disclosure.

FIG. 14 shows a diagram of a system 1400 including a device 1405 that supports control information-based packet stitching of self-scheduled uplink transmissions in accordance with one or more aspects of the present disclosure. The device 1405 may be an example of or include components of a device 1105, a device 1205, or a network entity 105 as described herein. The device 1405 may communicate with other network devices or network equipment such as one or more of the network entities 105, UEs 115, or any combination thereof. The communications may include communications over one or more wired interfaces, over one or more wireless interfaces, or any combination thereof. The device 1405 may include components that support outputting and obtaining communications, such as a communications manager 1420, a transceiver 1410, one or more antennas 1415, at least one memory 1425, code 1430, and at least one processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or one or more memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or one or more memory components (e.g., the at least one processor 1435, the at least one memory 1425, or both), may be included in a chip or chip assembly that is installed in the device 1405. In some examples, the transceiver 1410 may be operable to support communications via one or more communications links (e.g., communication link(s) 125, backhaul communication link(s) 120, a midhaul communication link 162, a fronthaul communication link 168).

The at least one memory 1425 may include RAM, ROM, or any combination thereof. The at least one memory 1425 may store computer-readable, computer-executable, or processor-executable code, such as the code 1430. The code 1430 may include instructions that, when executed by one or more of the at least one processor 1435, cause the device 1405 to perform various functions described herein. The code 1430 may be stored in a non-transitory computer-readable medium such as system memory or another type of memory. In some cases, the code 1430 may not be directly executable by a processor of the at least one processor 1435 but may cause a computer (e.g., when compiled and executed) to perform functions described herein. In some cases, the at least one memory 1425 may include, among other things, a BIOS which may control basic hardware or software operation such as the interaction with peripheral components or devices. In some examples, the at least one processor 1435 may include multiple processors and the at least one memory 1425 may include multiple memories. One or more of the multiple processors may be coupled with one or more of the multiple memories which may, individually or collectively, be configured to perform various functions herein (for example, as part of a processing system).

The at least one processor 1435 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1435 may be configured to operate a memory array using a memory controller. In some other cases, a memory controller may be integrated into one or more of the at least one processor 1435. The at least one processor 1435 may be configured to execute computer-readable instructions stored in a memory (e.g., one or more of the at least one memory 1425) to cause the device 1405 to perform various functions (e.g., functions or tasks supporting control information-based packet stitching of self-scheduled uplink transmissions). For example, the device 1405 or a component of the device 1405 may include at least one processor 1435 and at least one memory 1425 coupled with one or more of the at least one processor 1435, the at least one processor 1435 and the at least one memory 1425 configured to perform various functions described herein. The at least one processor 1435 may be an example of a cloud-computing platform (e.g., one or more physical nodes and supporting software such as operating systems, virtual machines, or container instances) that may host the functions (e.g., by executing code 1430) to perform the functions of the device 1405. The at least one processor 1435 may be any one or more suitable processors capable of executing scripts or instructions of one or more software programs stored in the device 1405 (such as within one or more of the at least one memory 1425).

In some examples, the at least one processor 1435 may include multiple processors and the at least one memory 1425 may include multiple memories. One or more of the multiple processors may be coupled with one or more of the multiple memories, which may, individually or collectively, be configured to perform various functions herein. In some examples, the at least one processor 1435 may be a component of a processing system, which may refer to a system (such as a series) of machines, circuitry (including, for example, one or both of processor circuitry (which may include the at least one processor 1435) and memory circuitry (which may include the at least one memory 1425)), or components, that receives or obtains inputs and processes the inputs to produce, generate, or obtain a set of outputs. The processing system may be configured to perform one or more of the functions described herein. For example, the at least one processor 1435 or a processing system including the at least one processor 1435 may be configured to, configurable to, or operable to cause the device 1405 to perform one or more of the functions described herein. Further, as described herein, being "configured to," being "configurable to," and being "operable to" may be used interchangeably and may be associated with a capability, when executing code stored in the at least one memory 1425 or otherwise, to perform one or more of the functions described herein.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the at least one memory 1425, the code 1430, and the at least one processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with one or more other network entities 105, and may include a controller or scheduler for controlling communications with UEs 115 (e.g., in cooperation with the one or more other network devices). In some examples, the communications manager 1420 may support an X2 interface within an LTE/LTE-A wireless communications network technology to provide communication between network entities 105.

The communications manager 1420 may support wireless communication in accordance with examples as disclosed herein. For example, the communications manager 1420 is capable of, configured to, or operable to support a means for transmitting control signaling that indicates an uplink resource pool associated with UE self-scheduled transmissions. The communications manager 1420 is capable of, configured to, or operable to support a means for receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet. The communications manager 1420 is capable of, configured to, or operable to support a means for processing the set of multiple units in association with attempting to individually decode the respective control information within each unit of the set of multiple units and attempting to jointly decode the set of multiple portions of the coded packet in accordance with the ordered sequence of the set of multiple units.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, one or more of the at least one processor 1435, one or more of the at least one memory 1425, the code 1430, or any combination thereof (for example, by a processing system including at least a portion of the at least one processor 1435, the at least one memory 1425, the code 1430, or any combination thereof). For example, the code 1430 may include instructions executable by one or more of the at least one processor 1435 to cause the device 1405 to perform various aspects of control information-based packet stitching of self-scheduled uplink transmissions as described herein, or the at least one processor 1435 and the at least one memory 1425 may be otherwise configured to, individually or collectively, perform or support such operations.

Figure 15:
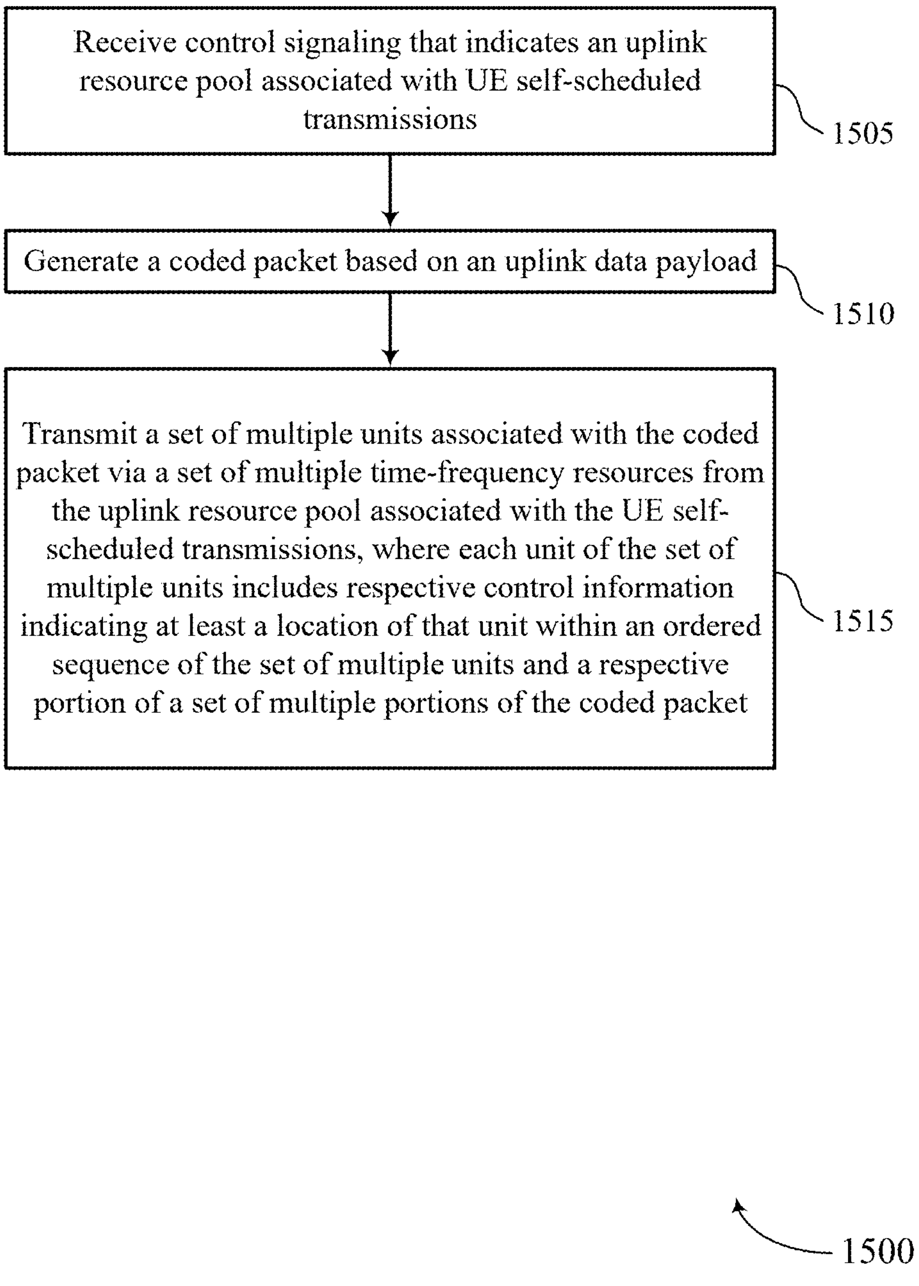

FIG. 15 shows a flowchart illustrating a method 1500 that supports control information-based packet stitching of self-scheduled uplink transmissions in accordance with one or more aspects of the present disclosure. The operations of the method 1500 may be implemented by a UE or its components as described herein. For example, the operations of the method 1500 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1505, the method may include receiving control signaling that indicates an uplink resource pool associated with UE self-scheduled transmissions. The operations of 1505 may be performed in accordance with examples as disclosed herein. In some examples, aspects of the operations of 1505 may be performed by an uplink resource pool component 925 as described with reference to FIG. 9.

At 1510, the method may include generating a coded packet based on an uplink data payload. The operations of 1510 may be performed in accordance with examples as disclosed herein. In some examples, aspects of the operations of 1510 may be performed by a packet encoding component 930 as described with reference to FIG. 9.

At 1515, the method may include transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet. The operations of 1515 may be performed in accordance with examples as disclosed herein. In some examples, aspects of the operations of 1515 may be performed by a packet unit transmission component 935 as described with reference to FIG. 9.

Figure 16:
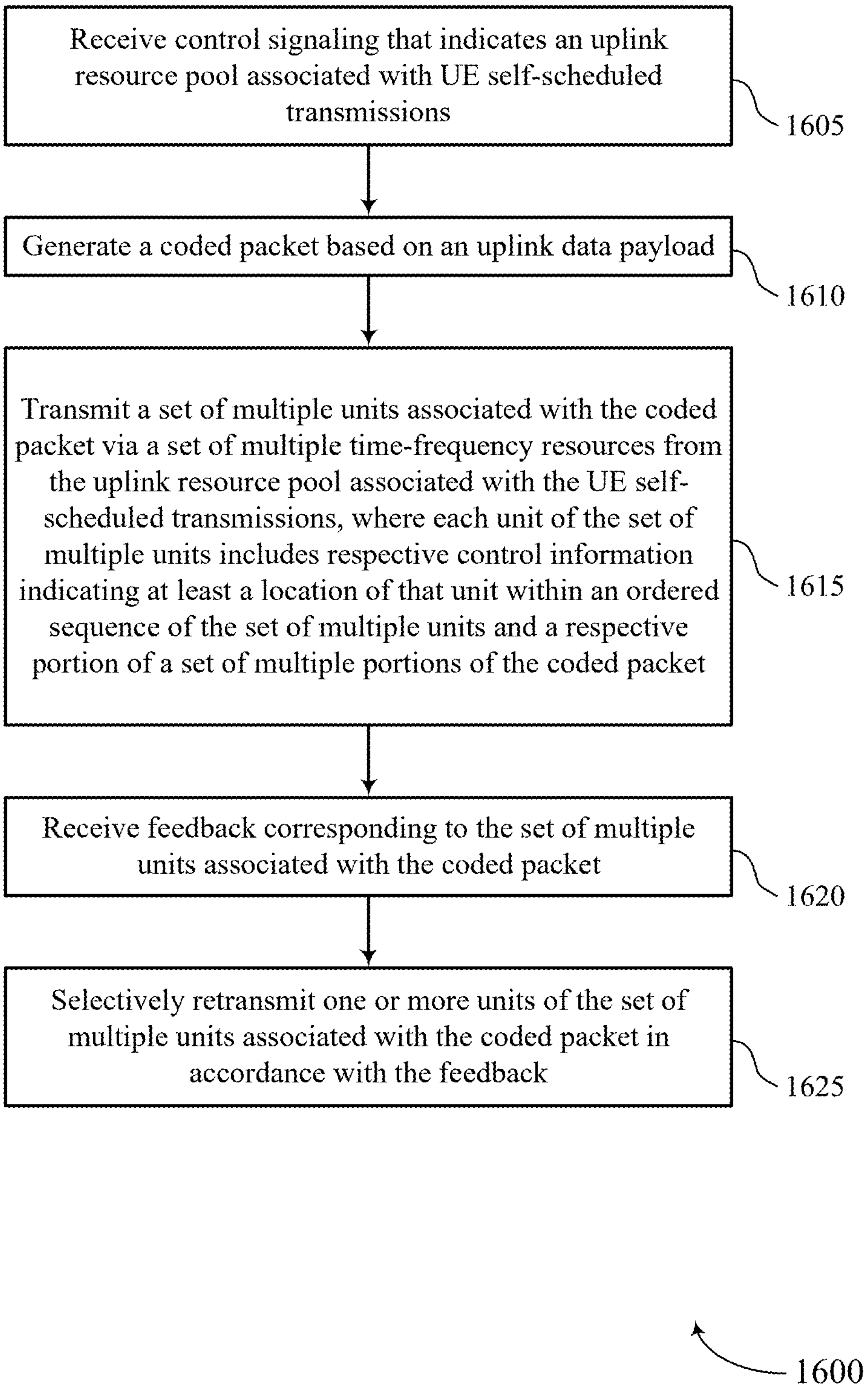

FIG. 16 shows a flowchart illustrating a method 1600 that supports control information-based packet stitching of self-scheduled uplink transmissions in accordance with one or more aspects of the present disclosure. The operations of the method 1600 may be implemented by a UE or its components as described herein. For example, the operations of the method 1600 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1605, the method may include receiving control signaling that indicates an uplink resource pool associated with UE self-scheduled transmissions. The operations of 1605 may be performed in accordance with examples as disclosed herein. In some examples, aspects of the operations of 1605 may be performed by an uplink resource pool component 925 as described with reference to FIG. 9.

At 1610, the method may include generating a coded packet based on an uplink data payload. The operations of 1610 may be performed in accordance with examples as disclosed herein. In some examples, aspects of the operations of 1610 may be performed by a packet encoding component 930 as described with reference to FIG. 9.

At 1615, the method may include transmitting a set of multiple units associated with the coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions of the coded packet. The operations of 1615 may be performed in accordance with examples as disclosed herein. In some examples, aspects of the operations of 1615 may be performed by a packet unit transmission component 935 as described with reference to FIG. 9.

At 1620, the method may include receiving feedback corresponding to the set of multiple units associated with the coded packet. The operations of 1620 may be performed in accordance with examples as disclosed herein. In some examples, aspects of the operations of 1620 may be performed by a feedback component 940 as described with reference to FIG. 9.

At 1625, the method may include selectively retransmitting one or more units of the set of multiple units associated with the coded packet in accordance with the feedback. The operations of 1625 may be performed in accordance with examples as disclosed herein. In some examples, aspects of the operations of 1625 may be performed by a packet unit transmission component 935 as described with reference to FIG. 9.

FIG. 17 shows a flowchart illustrating a method 1700 that supports control information-based packet stitching of self-scheduled uplink transmissions in accordance with one or more aspects of the present disclosure. The operations of the method 1700 may be implemented by a network entity or its components as described herein. For example, the operations of the method 1700 may be performed by a network entity as described with reference to FIGS. 1-6 and 11-14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling that indicates an uplink resource pool associated with UE self-scheduled transmissions. The operations of 1705 may be performed in accordance with examples as disclosed herein. In some examples, aspects of the operations of 1705 may be performed by an uplink resource pool component 1325 as described with reference to FIG. 13.

At 1710, the method may include receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet. The operations of 1710 may be performed in accordance with examples as disclosed herein. In some examples, aspects of the operations of 1710 may be performed by a packet unit reception component 1330 as described with reference to FIG. 13.

At 1715, the method may include processing the set of multiple units in association with attempting to individually decode the respective control information within each unit of the set of multiple units and attempting to jointly decode the set of multiple portions of the coded packet in accordance with the ordered sequence of the set of multiple units. The operations of 1715 may be performed in accordance with examples as disclosed herein. In some examples, aspects of the operations of 1715 may be performed by a packet unit processing component 1335 as described with reference to FIG. 13.

Figure 18:
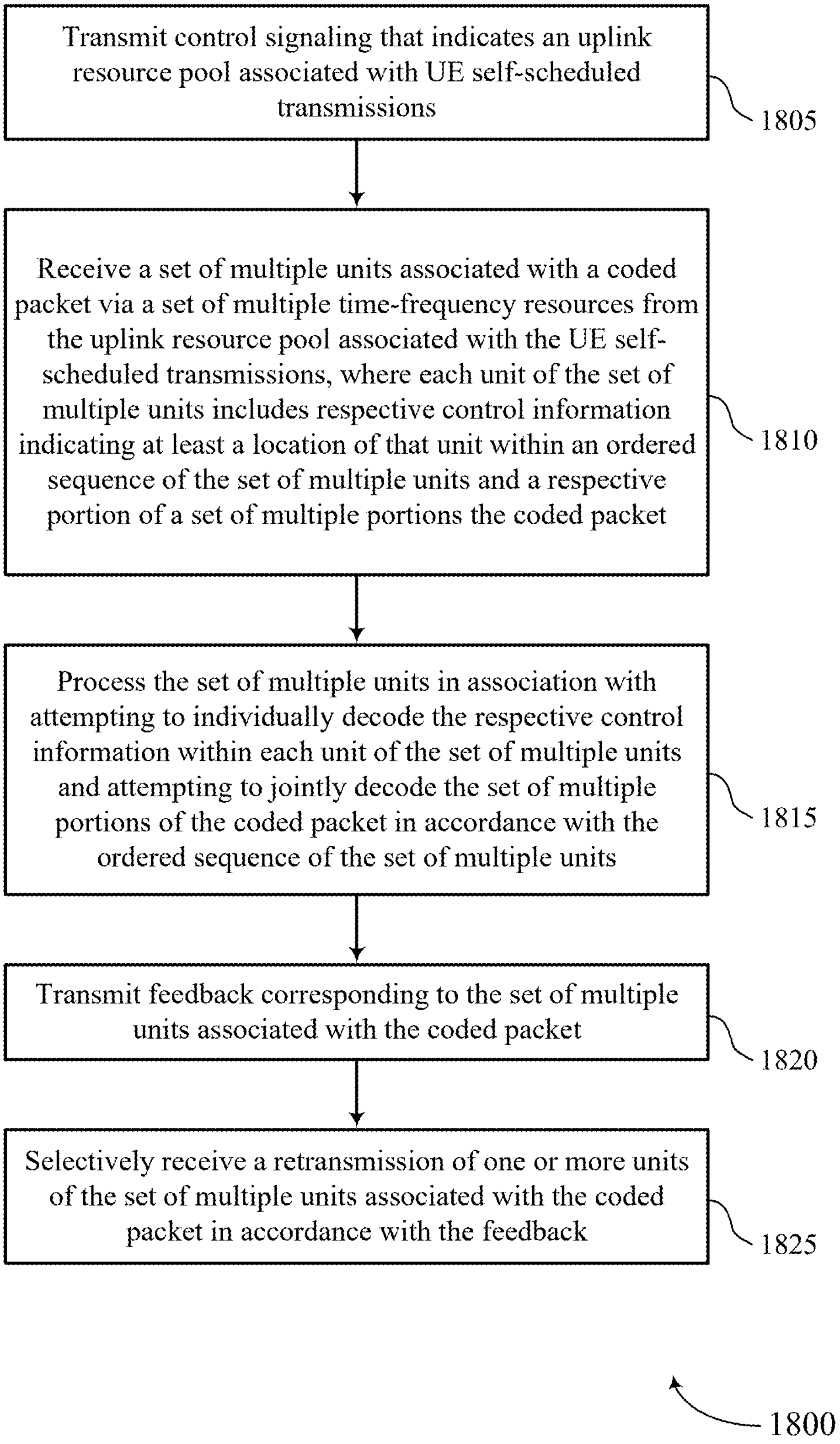

FIG. 18 shows a flowchart illustrating a method 1800 that supports control information-based packet stitching of self-scheduled uplink transmissions in accordance with one or more aspects of the present disclosure. The operations of the method 1800 may be implemented by a network entity or its components as described herein. For example, the operations of the method 1800 may be performed by a network entity as described with reference to FIGS. 1-6 and 11-14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting control signaling that indicates an uplink resource pool associated with UE self-scheduled transmissions. The operations of 1805 may be performed in accordance with examples as disclosed herein. In some examples, aspects of the operations of 1805 may be performed by an uplink resource pool component 1325 as described with reference to FIG. 13.

At 1810, the method may include receiving a set of multiple units associated with a coded packet via a set of multiple time-frequency resources from the uplink resource pool associated with the UE self-scheduled transmissions, where each unit of the set of multiple units includes respective control information indicating at least a location of that unit within an ordered sequence of the set of multiple units and a respective portion of a set of multiple portions the coded packet. The operations of 1810 may be performed in accordance with examples as disclosed herein. In some examples, aspects of the operations of 1810 may be performed by a packet unit reception component 1330 as described with reference to FIG. 13.

At 1815, the method may include processing the set of multiple units in association with attempting to individually decode the respective control information within each unit of the set of multiple units and attempting to jointly decode the set of multiple portions of the coded packet in accordance with the ordered sequence of the set of multiple units. The operations of 1815 may be performed in accordance with examples as disclosed herein. In some examples, aspects of the operations of 1815 may be performed by a packet unit processing component 1335 as described with reference to FIG. 13.

At 1820, the method may include transmitting feedback corresponding to the set of multiple units associated with the coded packet. The operations of 1820 may be performed in accordance with examples as disclosed herein. In some examples, aspects of the operations of 1820 may be performed by a feedback component 1340 as described with reference to FIG. 13.

At 1825, the method may include selectively receiving a retransmission of one or more units of the set of multiple units associated with the coded packet in accordance with the feedback. The operations of 1825 may be performed in accordance with examples as disclosed herein. In some examples, aspects of the operations of 1825 may be performed by a packet unit reception component 1330 as described with reference to FIG. 13.

The following provides an overview of aspects of the present disclosure:

Aspect 1: A method for wireless communication at a UE, comprising: receiving control signaling that indicates an uplink resource pool associated with UE self-scheduled transmissions; generating a coded packet based on an uplink data payload; and transmitting a plurality of units associated with the coded packet via a plurality of time-frequency resources from the uplink resource pool associated with the UE self-scheduled transmissions, wherein each unit of the plurality of units includes respective control information indicating at least a location of that unit within an ordered sequence of the plurality of units and a respective portion of a plurality of portions of the coded packet.

Aspect 2: The method of aspect 1, wherein transmitting the plurality of units associated with the coded packet comprises: transmitting a first unit associated with the coded packet via a first time-frequency resource of the plurality of time-frequency resources, wherein the first unit includes first control information indicating at least a first location of the first unit within the ordered sequence of the plurality of units and a first portion of the coded packet; and transmitting a second unit associated with the coded packet via a second time-frequency resource of the plurality of time-frequency resources, wherein the second unit includes second control information indicating at least a second location of the second unit within the ordered sequence of the plurality of units and a second portion of the coded packet.

Aspect 3: The method of any of aspects 1-2, wherein the respective control information within each unit of the plurality of units is associated with an independent CRC, the respective control information within each unit of the plurality of units being self-decodable in accordance with being associated with the independent CRC.

Aspect 4: The method of any of aspects 1-3, wherein the respective control information within each unit of the plurality of units is associated with an identifier of the UE or indicates a quantity of the plurality of units associated with the coded packet.

Aspect 5: The method of any of aspects 1-4, wherein the respective control information within each unit of the plurality of units indicates a size or an MCS associated with a time-frequency resource via which that unit of the plurality of units is transmitted or indicates one or more time-frequency resources of the plurality of time-frequency resources via which one or more other units of the plurality of units are transmitted.

Aspect 6: The method of any of aspects 1-5, further comprising: receiving feedback corresponding to the plurality of units associated with the coded packet; and selectively retransmitting one or more units of the plurality of units associated with the coded packet in accordance with the feedback.

Aspect 7: The method of aspect 6, wherein the feedback is received via a UE-specific DCI message.

Aspect 8: The method of any of aspects 6-7, wherein the feedback is received via a downlink shared channel message that comprises feedback associated with a plurality of UEs including the UE, and the downlink shared channel message is scheduled by a DCI message scrambled by an identifier corresponding to the uplink resource pool associated with the UE self-scheduled transmissions.

Aspect 9: The method of any of aspects 6-8, wherein the feedback indicates, for each unit of the plurality of units, whether the respective control information within that unit of the plurality of units is successfully decoded or unsuccessfully decoded.

Aspect 10: The method of aspect 9, wherein the feedback further indicates whether the coded packet is successfully decoded or unsuccessfully decoded.

Aspect 11: The method of any of aspects 6-10, wherein the feedback indicates that the coded packet is unsuccessfully decoded and indicates an RVID to be used for a retransmission of the plurality of units associated with the coded packet.

Aspect 12: The method of any of aspects 6-11, wherein the feedback includes an uplink grant to be used for a retransmission of the one or more units of the plurality of units associated with the coded packet, and the UE retransmits the one or more units of the plurality of units via the uplink grant indicated by the feedback.

Aspect 13: The method of any of aspects 6-12, wherein the feedback excludes an uplink grant to be used for a retransmission of the one or more units of the plurality of units associated with the coded packet, and the UE retransmits the one or more units of the plurality of units via one or more time-frequency resources of the uplink resource pool associated with the UE self-scheduled transmissions.

Aspect 14: The method of any of aspects 6-13, wherein the feedback indicates a TPC command associated with a retransmission of the one or more units of the plurality of units.

Aspect 15: The method of any of aspects 6-14, wherein selectively retransmitting one or more units of the plurality of units associated with the coded packet in accordance with the feedback comprises: retransmitting a subset of the plurality of units associated with the coded packet in accordance with the feedback indicating that the respective control information within each unit of the subset of the plurality of units was unsuccessfully decoded; retransmitting each unit of the plurality of units associated with the coded packet in accordance with the feedback indicating that the coded packet was unsuccessfully decoded; retransmitting each unit of the plurality of units associated with the coded packet based on an RVID in accordance with the feedback indicating that the coded packet is unsuccessfully decoded and indicating the RVID; or refraining from retransmitting the plurality of units associated with the coded packet in accordance with the feedback indicating that the respective control information within each unit of the plurality of units was successfully decoded and indicating that the coded packet was successfully decoded.

Aspect 16: The method of any of aspects 1-15, wherein the respective control information within each unit of the plurality of units is self-decodable, and the respective portion of the coded packet within each unit of the plurality of units is not self-decodable.

Aspect 17: The method of any of aspects 1-16, wherein the respective control information within each unit of the plurality of units is included in a physical layer header of that unit of the plurality of units.

Aspect 18: A method for wireless communication at a network entity, comprising: transmitting control signaling that indicates an uplink resource pool associated with UE self-scheduled transmissions; receiving a plurality of units associated with a coded packet via a plurality of time-frequency resources from the uplink resource pool associated with the UE self-scheduled transmissions, wherein each unit of the plurality of units includes respective control information indicating at least a location of that unit within an ordered sequence of the plurality of units and a respective portion of a plurality of portions the coded packet; and processing the plurality of units in association with attempting to individually decode the respective control information within each unit of the plurality of units and attempting to jointly decode the plurality of portions of the coded packet in accordance with the ordered sequence of the plurality of units.

Aspect 19: The method of aspect 18, wherein receiving the plurality of units associated with the coded packet via the plurality of time-frequency resources comprises: receiving a first unit associated with the coded packet via a first time-frequency resource of the plurality of time-frequency resources, wherein the first unit includes first control information indicating at least a first location of the first unit within the ordered sequence of the plurality of units and a first portion of the coded packet; and receiving a second unit associated with the coded packet via a second time-frequency resource of the plurality of time-frequency resources, wherein the second unit includes second control information indicating at least a second location of the second unit within the ordered sequence of the plurality of units and a second portion of the coded packet.

Aspect 20: The method of aspect 19, wherein processing the plurality of units comprises: attempting to decode the first control information in accordance a first independent CRC associated with the first control information; attempting to decode the second control information in accordance a second independent CRC associated with the second control information; and attempting to decode an ordered combination of the first portion of the coded packet and the second portion of the coded packet in accordance with the first control information and the second control information.

Aspect 21: The method of any of aspects 18-20, wherein the respective control information within each unit of the plurality of units is associated with an independent CRC, the respective control information within each unit of the plurality of units being self-decodable in accordance with being associated with the independent CRC.

Aspect 22: The method of any of aspects 18-21, wherein the respective control information within each unit of the plurality of units is associated with an identifier of a UE or indicates a quantity of the plurality of units associated with the coded packet, and processing the plurality of units is in accordance with the identifier of the UE or the quantity of the plurality of units.

Aspect 23: The method of any of aspects 18-22, wherein the respective control information within each unit of the plurality of units indicates a size or an MCS associated with a time-frequency resource via which that unit of the plurality of units is transmitted or indicates one or more time-frequency resources of the plurality of time-frequency resources via which one or more other units of the plurality of units are transmitted.

Aspect 24: The method of any of aspects 18-23, further comprising: transmitting feedback corresponding to the plurality of units associated with the coded packet; and selectively receiving a retransmission of one or more units of the plurality of units associated with the coded packet in accordance with the feedback.

Aspect 25: The method of aspect 24, wherein the feedback is transmitted via a UE-specific DCI message.

Aspect 26: The method of any of aspects 24-25, wherein the feedback is transmitted via a downlink shared channel message that comprises feedback associated with a plurality of UEs, and the downlink shared channel message is scheduled by a DCI message scrambled by an identifier corresponding to the uplink resource pool associated with the UE self-scheduled transmissions.

Aspect 27: The method of any of aspects 24-26, wherein the feedback indicates, for each unit of the plurality of units, whether the respective control information within that unit of the plurality of units is successfully decoded or unsuccessfully decoded.

Aspect 28: The method of aspect 27, wherein the feedback further indicates whether the coded packet is successfully decoded or unsuccessfully decoded.

Aspect 29: The method of any of aspects 24-28, wherein the feedback indicates that the coded packet is unsuccessfully decoded and indicates an RVID to be used for the retransmission of the plurality of units associated with the coded packet.

Aspect 30: The method of any of aspects 24-29, wherein the feedback includes an uplink grant to be used for the retransmission of the one or more units of the plurality of units associated with the coded packet, and the network entity receives the retransmission of the one or more units of the plurality of units via the uplink grant indicated by the feedback.

Aspect 31: The method of any of aspects 24-30, wherein the feedback excludes an uplink grant to be used for the retransmission of the one or more units of the plurality of units associated with the coded packet, and the network entity receives the retransmission of the one or more units of the plurality of units via one or more time-frequency resources of the uplink resource pool associated with the UE self-scheduled transmissions.

Aspect 32: The method of any of aspects 24-31, wherein the feedback indicates a TPC command associated with the retransmission of the one or more units of the plurality of units.

Aspect 33: The method of any of aspects 24-32, wherein the one or more units of the plurality of units associated with the coded packet comprise a subset of the plurality of units associated with the coded packet in accordance with the feedback indicating that the respective control information within each unit of the subset of the plurality of units was unsuccessfully decoded or comprise a complete set of the plurality of units associated with the coded packet in accordance with the feedback indicating that the coded packet was unsuccessfully decoded.

Aspect 34: The method of any of aspects 24-33, wherein the feedback indicates that the respective control information within each unit of the plurality of units was successfully decoded or that the coded packet was successfully decoded, and the retransmission of the one or more units of the plurality of units comprises is not performed in accordance with the feedback.

Aspect 35: The method of any of aspects 18-34, wherein the respective control information within each unit of the plurality of units is self-decodable, and the respective portion of the coded packet within each unit of the plurality of units is not self-decodable.

Aspect 36: The method of any of aspects 18-35, wherein the respective control information within each unit of the plurality of units is included in a physical layer header of that unit of the plurality of units.

Aspect 37: A UE for wireless communication (or an apparatus for wireless communication at a UE), comprising one or more memories storing processor-executable code, and one or more processors coupled with the one or more memories and individually or collectively operable to execute the code to cause the UE (or the apparatus) to perform a method of any of aspects 1-17.

Aspect 38: A UE for wireless communication, comprising at least one means for performing a method of any of aspects 1-17.

Aspect 39: A non-transitory computer-readable medium storing code for wireless communication, the code comprising instructions executable by one or more processors to perform a method of any of aspects 1-17.

Aspect 40: A network entity for wireless communication (or an apparatus for wireless communication at a network entity), comprising one or more memories storing processor-executable code, and one or more processors coupled with the one or more memories and individually or collectively operable to execute the code to cause the network entity (or the apparatus) to perform a method of any of aspects 18-36.

Aspect 41: A network entity for wireless communication, comprising at least one means for performing a method of any of aspects 18-36.

Aspect 42: A non-transitory computer-readable medium storing code for wireless communication, the code comprising instructions executable by one or more processors to perform a method of any of aspects 18-36.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive control signaling that indicates an uplink resource pool associated with UE self-scheduled transmissions;

generate a coded packet based on an uplink data payload; and transmit a plurality of units associated with the coded packet via a plurality of time-frequency resources from the uplink resource pool associated with the UE self-scheduled transmissions, wherein each unit of the plurality of units includes:

respective control information indicating at least a location of that unit within an ordered sequence of the plurality of units, and a respective portion of a plurality of portions of the coded packet.

2. The UE of claim 1, wherein, to transmit the plurality of units associated with the coded packet, the one or more processors are individually or collectively operable to execute the code to cause the UE to:

transmit a first unit associated with the coded packet via a first time-frequency resource of the plurality of time-frequency resources, wherein the first unit includes first control information indicating at least a first location of the first unit within the ordered sequence of the plurality of units and a first portion of the coded packet; and transmit a second unit associated with the coded packet via a second time-frequency resource of the plurality of time-frequency resources, wherein the second unit includes second control information indicating at least a second location of the second unit within the ordered sequence of the plurality of units and a second portion of the coded packet.

3. The UE of claim 1, wherein the respective control information within each unit of the plurality of units is associated with an independent cyclic redundancy check, the respective control information within each unit of the plurality of units being self-decodable in accordance with being associated with the independent cyclic redundancy check.

4. The UE of claim 1, wherein the respective control information within each unit of the plurality of units is associated with an identifier of the UE or indicates a quantity of the plurality of units associated with the coded packet.

5. The UE of claim 1, wherein the respective control information within each unit of the plurality of units indicates a size or a modulation and coding scheme associated with a time-frequency resource via which that unit of the plurality of units is transmitted, or indicates one or more time-frequency resources of the plurality of time-frequency resources via which one or more other units of the plurality of units are transmitted.

6. The UE of claim 1, wherein the one or more processors are individually or collectively further operable to execute the code to cause the UE to:

receive feedback corresponding to the plurality of units associated with the coded packet; and selectively retransmit one or more units of the plurality of units associated with the coded packet in accordance with the feedback.

7. The UE of claim 6, wherein the feedback is received via a UE-specific downlink control information message.

8. The UE of claim 6, wherein:

the feedback is received via a downlink shared channel message that comprises feedback associated with a plurality of UEs including the UE; and the downlink shared channel message is scheduled by a downlink control information message scrambled by an identifier corresponding to the uplink resource pool associated with the UE self-scheduled transmissions.

9. The UE of claim 6, wherein the feedback indicates, for each unit of the plurality of units, whether the respective control information within that unit of the plurality of units is successfully decoded or unsuccessfully decoded.

10. The UE of claim 9, wherein the feedback further indicates whether the coded packet is successfully decoded or unsuccessfully decoded.

11. The UE of claim 6, wherein the feedback indicates that the coded packet is unsuccessfully decoded and indicates a redundancy version identifier to be used for a retransmission of the plurality of units associated with the coded packet.

12. The UE of claim 6, wherein:

the feedback includes an uplink grant to be used for a retransmission of the one or more units of the plurality of units associated with the coded packet; and the UE retransmits the one or more units of the plurality of units via the uplink grant indicated by the feedback.

13. The UE of claim 6, wherein:

the feedback excludes an uplink grant to be used for a retransmission of the one or more units of the plurality of units associated with the coded packet; and the UE retransmits the one or more units of the plurality of units via one or more time-frequency resources of the uplink resource pool associated with the UE self-scheduled transmissions.

14. The UE of claim 6, wherein the feedback indicates a transmit power control command associated with a retransmission of the one or more units of the plurality of units.

15. The UE of claim 6, wherein, to selectively retransmit one or more units of the plurality of units associated with the coded packet in accordance with the feedback, the one or more processors are individually or collectively operable to execute the code to cause the UE to:

retransmit a subset of the plurality of units associated with the coded packet in accordance with the feedback indicating that the respective control information within each unit of the subset of the plurality of units was unsuccessfully decoded;

retransmit each unit of the plurality of units associated with the coded packet in accordance with the feedback indicating that the coded packet was unsuccessfully decoded;

retransmit each unit of the plurality of units associated with the coded packet based on a redundancy version identifier in accordance with the feedback indicating that the coded packet is unsuccessfully decoded and indicating the redundancy version identifier; or refrain from retransmitting the plurality of units associated with the coded packet in accordance with the feedback indicating that the respective control information within each unit of the plurality of units was successfully decoded and that the coded packet was successfully decoded.

16. The UE of claim 1, wherein:

the respective control information within each unit of the plurality of units is self-decodable; and the respective portion of the coded packet within each unit of the plurality of units is not self-decodable.

17. The UE of claim 1, wherein the respective control information within each unit of the plurality of units is included in a physical layer header of that unit of the plurality of units.

18. A network entity, comprising:

one or more memories storing processor-executable code; and one or more processors coupled with the one or more memories and individually or collectively operable to execute the code to cause the network entity to:
transmit control signaling that indicates an uplink resource pool associated with user equipment (UE) self-scheduled transmissions;
receive a plurality of units associated with a coded packet via a plurality of time-frequency resources from the uplink resource pool associated with the UE self-scheduled transmissions, wherein each unit of the plurality of units includes respective control information indicating at least a location of that unit within an ordered sequence of the plurality of units and a respective portion of a plurality of portions the coded packet; and
process the plurality of units in association with:
an attempt to individually decode the respective control information within each unit of the plurality of units, and
an attempt to jointly decode the plurality of portions of the coded packet in accordance with the ordered sequence of the plurality of units.

19. The network entity of claim 18, wherein, to receive the plurality of units associated with the coded packet via the plurality of time-frequency resources, the one or more processors are individually or collectively operable to execute the code to cause the network entity to:
receive a first unit associated with the coded packet via a first time-frequency resource of the plurality of time-frequency resources, wherein the first unit includes first control information indicating at least a first location of the first unit within the ordered sequence of the plurality of units and a first portion of the coded packet; and
receive a second unit associated with the coded packet via a second time-frequency resource of the plurality of time-frequency resources, wherein the second unit includes second control information indicating at least a second location of the second unit within the ordered sequence of the plurality of units and a second portion of the coded packet.

20. The network entity of claim 19, wherein, to process the plurality of units, the one or more processors are individually or collectively operable to execute the code to cause the network entity to:
attempt to decode the first control information in accordance with a first independent cyclic redundancy check associated with the first control information;
attempt to decode the second control information in accordance with a second independent cyclic redundancy check associated with the second control information; and
attempt to decode an ordered combination of the first portion of the coded packet and the second portion of the coded packet in accordance with the first control information and the second control information.

21. The network entity of claim 18, wherein the respective control information within each unit of the plurality of units is associated with an independent cyclic redundancy check, the respective control information within each unit of the plurality of units being self-decodable in accordance with being associated with the independent cyclic redundancy check.

22. The network entity of claim 18, wherein the respective control information within each unit of the plurality of units is associated with an identifier of a UE or indicates a quantity of the plurality of units associated with the coded packet, and wherein processing the plurality of units is in accordance with the identifier of the UE or the quantity of the plurality of units.

23. The network entity of claim 18, wherein:
the respective control information within each unit of the plurality of units is self-decodable; and
the respective portion of the coded packet within each unit of the plurality of units is not self-decodable.

24. A method for wireless communication at a user equipment (UE), comprising:
receiving control signaling that indicates an uplink resource pool associated with UE self-scheduled transmissions;
generating a coded packet based on an uplink data payload; and
transmitting a plurality of units associated with the coded packet via a plurality of time-frequency resources from the uplink resource pool associated with the UE self-scheduled transmissions, wherein each unit of the plurality of units includes:
respective control information indicating at least a location of that unit within an ordered sequence of the plurality of units, and
a respective portion of a plurality of portions of the coded packet.

25. The method of claim 24, wherein transmitting the plurality of units associated with the coded packet comprises:
transmitting a first unit associated with the coded packet via a first time-frequency resource of the plurality of time-frequency resources, wherein the first unit includes first control information indicating at least a first location of the first unit within the ordered sequence of the plurality of units and a first portion of the coded packet; and
transmitting a second unit associated with the coded packet via a second time-frequency resource of the plurality of time-frequency resources, wherein the second unit includes second control information indicating at least a second location of the second unit within the ordered sequence of the plurality of units and a second portion of the coded packet.

26. The method of claim 24, wherein the respective control information within each unit of the plurality of units is associated with an independent cyclic redundancy check, the respective control information within each unit of the plurality of units being self-decodable in accordance with being associated with the independent cyclic redundancy check.

27. The method of claim 24, further comprising:
receiving feedback corresponding to the plurality of units associated with the coded packet; and
selectively retransmitting one or more units of the plurality of units associated with the coded packet in accordance with the feedback.

28. A method for wireless communication at a network entity, comprising:
transmitting control signaling that indicates an uplink resource pool associated with user equipment (UE) self-scheduled transmissions;
receiving a plurality of units associated with a coded packet via a plurality of time-frequency resources from the uplink resource pool associated with the UE self-scheduled transmissions, wherein each unit of the plurality of units includes respective control information indicating at least a location of that unit within an ordered sequence of the plurality of units and a respective portion of a plurality of portions the coded packet; and processing the plurality of units in association with:

attempting to individually decode the respective control information within each unit of the plurality of units, and attempting to jointly decode the plurality of portions of the coded packet in accordance with the ordered sequence of the plurality of units.

29. The method of claim 28, wherein receiving the plurality of units associated with the coded packet via the plurality of time-frequency resources comprises:

receiving a first unit associated with the coded packet via a first time-frequency resource of the plurality of time-frequency resources, wherein the first unit includes first control information indicating at least a first location of the first unit within the ordered sequence of the plurality of units and a first portion of the coded packet; and receiving a second unit associated with the coded packet via a second time-frequency resource of the plurality of time-frequency resources, wherein the second unit includes second control information indicating at least a second location of the second unit within the ordered sequence of the plurality of units and a second portion of the coded packet.

30. The method of claim 29, wherein processing the plurality of units comprises:

attempting to decode the first control information in accordance with a first independent cyclic redundancy check associated with the first control information;

attempting to decode the second control information in accordance with a second independent cyclic redundancy check associated with the second control information; and attempting to decode an ordered combination of the first portion of the coded packet and the second portion of the coded packet in accordance with the first control information and the second control information.

* * * * *